United States Patent
Hamamatsu et al.

(10) Patent No.: US 8,588,335 B2
(45) Date of Patent: Nov. 19, 2013

(54) RADIO COMMUNICATION DEVICE, RADIO COMMUNICATION METHOD, AND COMMUNICATION SYSTEM USING PADM TRANSMISSION DIVERSITY

(75) Inventors: Yoshihiro Hamamatsu, Tokyo (JP); Masaru Nobesawa, Tokyo (JP); Koji Tomitsuka, Tokyo (JP); Kenichiro Tanaka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/377,340

(22) PCT Filed: Aug. 13, 2010

(86) PCT No.: PCT/JP2010/005063
§ 371 (c)(1),
(2), (4) Date: Dec. 9, 2011

(87) PCT Pub. No.: WO2011/024403
PCT Pub. Date: Mar. 3, 2011

(65) Prior Publication Data
US 2012/0140854 A1   Jun. 7, 2012

(30) Foreign Application Priority Data
Aug. 27, 2009 (JP) .................. 2009-196724

(51) Int. Cl.
*H04L 27/36* (2006.01)
*H04L 27/00* (2006.01)
*H04L 25/34* (2006.01)

(52) U.S. Cl.
USPC ......................... 375/299; 375/295; 375/286

(58) Field of Classification Search
USPC .................. 375/308, 299, 302, 295
See application file for complete search history.

(56) References Cited

U.S. PATENT DOCUMENTS 7,773,694 B2    8/2010   Murakami et al.
2007/0222647 A1*  9/2007   Hamamoto ............... 341/50
(Continued)

FOREIGN PATENT DOCUMENTS

JP   2004 104503    4/2004
JP   2004 112471    4/2004
(Continued)

OTHER PUBLICATIONS

Kubo, H., et al., "Performance Improvement for MIMO Communication Systems Employing Per Transmit Antenna Differential Encoding (PADE)," IEE 16th International Symposium on Personal, Indoor and Mobile Radio Communications, vol. 1, pp. 42-46, (2005).

(Continued)

*Primary Examiner* — Chieh M Fan
*Assistant Examiner* — Brian J Stevens
(74) *Attorney, Agent, or Firm* — Oblon, Spivak, McClelland, Maier & Neustadt, L.L.P.

(57) ABSTRACT

A radio communication device which when transmitting both a first information sequence, on which π/4-shift differential phase shift modulation is performed, as a delayed wave and a second information sequence, on which a differential phase shift modulation is performed, as an advance wave by using a PADM (Per transmit Antenna Differential Mapping) method, interchanges signal points respectively belonging to quadrants which are one of a first quadrant and a third quadrant, a second quadrant and a fourth quadrant, the first quadrant and the second quadrant, the first quadrant and the fourth quadrant, the second quadrant and the third quadrant, and the third quadrant and the fourth quadrant, the signal points being included in signal points mapped onto a complex plane which consists of a real number axis and an imaginary number axis, to change the arrangement of the information sequence.

12 Claims, 23 Drawing Sheets

(56) References Cited

U.S. PATENT DOCUMENTS

2009/0219858 A1* 9/2009 Liang et al. ............... 370/328
2009/0290620 A1* 11/2009 Tzannes et al. ............ 375/219

FOREIGN PATENT DOCUMENTS

| | | |
|---|---|---|
| JP | 2006 173926 | 6/2006 |
| JP | 2006 295433 | 10/2006 |
| JP | 4094401 | 6/2008 |
| KR | 10-2008-0106461 | 12/2008 |
| WO | 2005 004367 | 1/2005 |

OTHER PUBLICATIONS

Kubo H., et al., "MIMO Communication Systems employing Per Transmit Antenna Differential Mapping (PADM)," IEICE Technical Report RCS2003-211, vol. 103, pp. 145-150, (Nov. 2003) (with English abstract).

International Search Report Issued Nov. 16, 2010 in PCT/JP10/05063 Filed Aug. 13, 2010.

Office Action (with English translation) mailed on Jul. 5, 2013, in counterpart Korean Appln No. 10-2012-7003456 (7 pages).

* cited by examiner

FIG.15
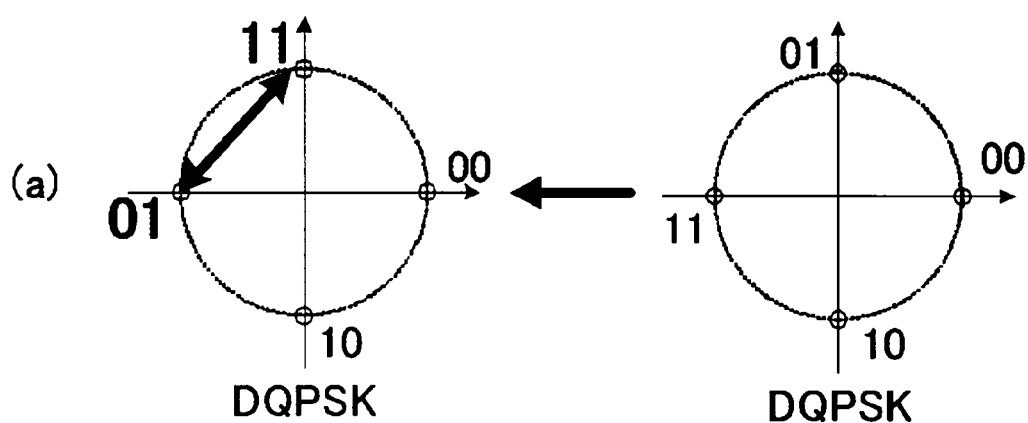
(a) DQPSK ← DQPSK
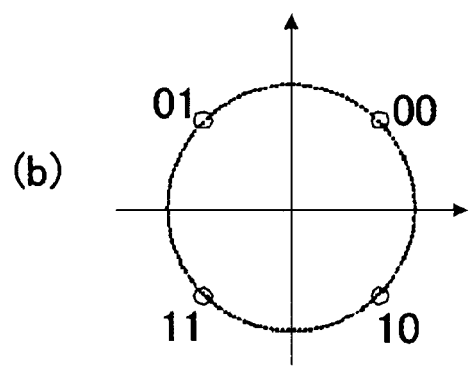
(b)
π/4DQPSK

RADIO COMMUNICATION DEVICE, RADIO COMMUNICATION METHOD, AND COMMUNICATION SYSTEM USING PADM TRANSMISSION DIVERSITY

FIELD OF THE INVENTION

The present invention relates to a radio communication device, a radio communication, and a communication system each of which uses PADM (Per transmit Antenna Differential Mapping) transmission diversity.

BACKGROUND OF THE INVENTION

In PADM (Per transmit Antenna Differential Mapping) transmission diversity, a differential modulation different for each transmit antenna is performed on identical data, and these data are transmitted. For example, by delaying the transmission timing of data to be transmitted via one of two antennas by one symbol and using an equalizer on a receive side, high resistance to variations in the transmission line can be achieved. The PADM transmission diversity is also referred to as a PADE (Per transmit Antenna Differential Encoding) method.

Currently, because modulation methods respectively used for antennas are the same as each other in a transmission time diversity system which is used typically, a blockage of one of the transmit antennas causes an occurrence of uncertainty in the timing and hence causes an error. The PADM is a method which has been proposed in order to solve this problem, and is a time diversity method of applying a different differential encoding mapping to each transmit antenna. When carrying out communications using the PADM, a transmit side performs creation of a modulated signal using the PADM, and a receive side executes a demodulation method using PSP (Per-Survivor Processing). Because demodulation characteristics degrade if a large frequency error occurs during transmission and reception when the receive side performs a demodulation using PSP, the receive side estimates the frequency error and corrects the frequency error on the basis of the estimation result, and then performs the PSP demodulation.

Patent reference 1 discloses a transmitter which, when transmitting signals created on the basis of an identical information sequence by using a single carrier from two transmit antennas, performs a different modulation process on each of encoded sequences respectively corresponding to the above-mentioned two antennas.

Furthermore, patent reference 2 discloses a receiver which estimates a frequency error of a received signal in a communication system which uses the PADM transmission diversity and carries out a demodulation process using PSP (Per-Survivor Processing).

RELATED ART DOCUMENT

Patent Reference

Patent reference 1: Japanese Patent No. 4094401
Patent reference 2: Japanese Unexamined Patent Application Publication No. 2006-173926

By the way, in the PADM transmission, a differential modulation different for each transmit antenna is performed on identical data (an identical information sequence). For example, a transmitter equipped with two antennas transmits a DQPSK (Differential quadrature phase shift keying) modulated signal as an advance wave from one of the antennas, and transmits a $\pi/4$-shift DQPSK modulated signal whose transmission timing is delayed by one symbol as a delayed wave from the other antenna. A receiver creates received signals at a plurality of symbol rates having different initial timing phases from the received signal which is over-sampled. The receiver then performs a maximum likelihood demodulation on each received signal at a symbol rate while changing the amount of frequency shift added to the received signal. As a result, the receiver can extract the demodulated result which satisfies requirements of highest reliability, and can also establish symbol timing synchronization and provide carrier frequency offset compensation.

The PADM method has a problem that the frequency deviation permissible range is limited because the frequency shift range which can be corrected by a frequency shift after digital processing is performed is narrow. When a $\pi/4$-shift DQPSK modulated signal which is a delayed wave, among a DQPSK modulated signal which is an advance wave and the $\pi/4$-shift DQPSK modulated signal which is a delayed wave, is blocked, only the advance wave (DQPSK-modulated signal) reaches the receive side. At this time, when a symbol normalized frequency offset having a deviation of 12.5% occurs in the DQPSK modulated signal which is the advance wave on the transmission line, the DQPSK modulated signal which is the advance wave matches the mapping of the $\pi/4$-shift DQPSK modulated signal which is the delayed wave as shown in a mapping view onto a complex plane of FIG. 16.

More specifically, because the source data of the DQPSK modulated signal which is the advance wave and in which a frequency deviation of 12.5% occurs is the same as that of the delayed wave even if the DQPSK modulated signal is demodulated by using a wrong modulation method, the advance wave is recognized as the delayed wave and is then demodulated in an environment where only the DQPSK modulated signal which is the advance wave is received by a mobile station (the $\pi/4$-shift DQPSK modulated signal which is the delayed wave cannot be received by the mobile station because of a blockage or the like). However, if the delayed wave, which the receive side was not able to receive because of a blockage or the like, reaches the receive side, since the demodulator recognizes the advance wave as a delayed wave, there occurs a phenomenon in which when receiving the delayed wave whose phase has been rotated by $\pi/4$ to demodulate the delayed wave, the mobile station becomes unable to demodulate the delayed wave because this delayed wave is equivalent to a $\pi/2$-shift DQPSK modulated signal.

Furthermore, the receive side performs a demodulation using PSP (Per-Survivor Processing) on a signal which is transmitted thereto by using the PADM. Because demodulation characteristics degrade if a large frequency error occurs during transmission and reception when the receive side performs a demodulation using PSP, the receive side estimates the frequency error and corrects the frequency error on the basis of the estimation result, and then performs the PSP demodulation. However, in the situation in which the $\pi/4$-shift DQPSK modulated signal which is the delayed wave is blocked, and a symbol normalized frequency offset having a deviation of 12.5% occurs in the DQPSK modulated signal which is the advance wave, there is a possibility that the receive side erroneously estimates the frequency deviation and a failure occurs in the PSP demodulation process because the receive side cannot determine whether or not the estimated frequency deviation is correct.

The present invention is made in order to solve the above-mentioned problems, and it is therefore an object of the present invention to provide a mapping method for enlarging a frequency deviation permissible range by applying different mapping rules to an advance wave and a delayed wave in a transmitter to perform PADM transmission.

SUMMARY OF THE INVENTION

In accordance with the present invention, there is provided a radio communication device which has two antennas and uses PADM (Per transmit Antenna Differential Mapping) transmission diversity of performing a different differential phase shift modulation for each of the transmit antennas on signals created on a basis of an identical information sequence, and transmitting the signals, and which carries out a demodulation process using PSP (Per-Survivor Processing), the radio communication device including: an encoding unit for performing an encoding process on an inputted information sequence for each of the transmit antennas; a delaying unit for delaying a transmission timing of a first one to be transmitted from one of the antennas, among information sequences which the encoding unit creates by encoding the inputted information sequence and which respectively correspond to the two antennas, with respect to a transmission timing of a second one of the information sequences to be transmitted from the other one of the antennas; a modulating unit for performing a $\pi/4$-shift differential phase shift modulation process on the first information sequence, and for performing a differential phase shift modulation process on the second information sequence; a mapping unit for mapping each of the first and second information sequences onto a complex plane which consists of a real number axis and an imaginary number axis as signal points; and an information sequence arrangement changing unit for interchanging signal points respectively belonging to quadrants which are one of a first quadrant and a third quadrant, a second quadrant and a fourth quadrant, the first quadrant and the second quadrant, the first quadrant and the fourth quadrant, the second quadrant and the third quadrant, and the third quadrant and the fourth quadrant, the signal points being included in the signal points of the first information sequence mapped onto the complex plane, to change arrangement of the information sequence.

In accordance with the present invention, there is provided a radio communication device which has two antennas and uses PADM (Per transmit Antenna Differential Mapping) transmission diversity of performing a different differential phase shift modulation for each of the transmit antennas on signals created on a basis of an identical information sequence, and transmitting the signals, and which carries out a demodulation process using PSP (Per-Survivor Processing), the radio communication device including: an encoding unit for performing an encoding process on an inputted information sequence for each of the transmit antennas; a delaying unit for delaying a transmission timing of a first one to be transmitted from one of the antennas, among information sequences which the encoding unit creates by encoding the inputted information sequence and which respectively correspond to the two antennas, with respect to a transmission timing of a second one of the information sequences to be transmitted from the other one of the antennas; a modulating unit for performing a $\pi/8$-shift differential phase shift modulation process on the first information sequence, and for performing a differential phase shift modulation process on the second information sequence; a mapping unit for mapping each of the first and second information sequences onto a complex plane which consists of a real number axis and an imaginary number axis as signal points; and an information sequence arrangement changing unit for interchanging the signal points of the first information sequence mapped onto the complex plane and signal points at positions which the information sequence arrangement changing unit acquires by performing an $(n/4) \times \pi$ (n is an integer ranging from 1 to 7)-shift differential phase shift modulation process on the signal points of the first information sequence to change arrangement of the information sequence.

In accordance with the present invention, there is provided a radio communication device which has two antennas and uses PADM (Per transmit Antenna Differential Mapping) transmission diversity of performing a different differential phase shift modulation for each of the transmit antennas on signals created on a basis of an identical information sequence, and transmitting the signals, and which carries out a demodulation process using PSP (Per-Survivor Processing), the radio communication device including: an encoding unit for performing an encoding process on an inputted information sequence for each of the transmit antennas; a delaying unit for delaying a transmission timing of a first one to be transmitted from one of the antennas, among information sequences which the encoding unit creates by encoding the inputted information sequence and which respectively correspond to the two antennas, with respect to a transmission timing of a second one of the information sequences to be transmitted from the other one of the antennas; a modulating unit for performing a $\pi/4$-shift differential phase shift modulation process on the first information sequence, and for performing a differential phase shift modulation process on the second information sequence; a mapping unit for mapping each of the first and second information sequences onto a complex plane which consists of a real number axis and an imaginary number axis as signal points; and an information sequence arrangement changing unit for interchanging signal points belonging to one of combinations including a combination of a signal point positioned on a positive real number axis and a signal point positioned on a negative real number axis, a combination of a signal point positioned on a positive imaginary number axis and a signal point positioned on a negative imaginary number axis, a combination of a signal point positioned on the positive real number axis and a signal point positioned on the positive imaginary number axis, a combination of a signal point positioned on the negative real number axis and a signal point positioned on the negative imaginary number axis, a combination of a signal point positioned on the positive real number axis and a signal point positioned on the negative imaginary number axis, and a combination of a signal point positioned on the negative real number axis and a signal point positioned on the positive imaginary number axis, among the signal points of the second information sequence mapped onto the complex plane, to change arrangement of the information sequence.

In accordance with the present invention, there is provided a radio communication device which has two antennas and uses PADM (Per transmit Antenna Differential Mapping) transmission diversity of performing a different differential phase shift modulation for each of the transmit antennas on signals created on a basis of an identical information sequence, and transmitting the signals, and which carries out a demodulation process using PSP (Per-Survivor Processing), the radio communication device including: an encoding unit for performing an encoding process on an inputted information sequence for each of the transmit antennas; a delaying unit for delaying a transmission timing of a first one to be transmitted from one of the antennas, among information sequences which the encoding unit creates by encoding the inputted information sequence and which respectively correspond to the two antennas, with respect to a transmission timing of a second one of the information sequences to be transmitted from the other one of the antennas; a modulating unit for performing a π/8-shift differential phase shift modulation process on the first information sequence, and for performing a differential phase shift modulation process on the second information sequence; a mapping unit for mapping each of the first and second information sequences onto a complex plane which consists of a real number axis and an imaginary number axis as signal points; and an information sequence arrangement changing unit for interchanging the signal points of the second information sequence mapped onto the complex plane and signal points at positions which the information sequence arrangement changing unit acquires by performing an (n/4)×π (n is an integer ranging from 1 to 7)-shift differential phase shift modulation process on the signal points of the second information sequence to change arrangement of the information sequence.

As a result, even if the mapping of the DQPSK modulated signal (advance wave) is rotated, the mapping does not match the π/4-shift DQPSK modulated signal (delayed wave). More specifically, because a receive side can discriminate between the advance wave and the delayed wave even when a frequency deviation of 12.5% occurs in the DQPSK modulated signal which is the advance wave on the transmission line, there is provided an advantage of being able to avoid erroneous estimation of the modulation method and the frequency deviation, and being able to prevent a failure from occurring in the PSP demodulation process performed by the receive side.

Furthermore, even if the mapping of the DQPSK modulated signal (advance wave) is rotated, the mapping does not match the π/8-shift DQPSK modulated signal (delayed wave). More specifically, because a receive side can discriminate between the advance wave and the delayed wave even when a frequency deviation of 6.25% occurs in the DQPSK modulated signal which is the advance wave on the transmission line, there is provided an advantage of being able to avoid erroneous estimation of the modulation method and the frequency deviation, and being able to prevent a failure from occurring in the PSP demodulation process performed by the receive side.

BRIEF DESCRIPTION OF THE FIGURES

FIG. 15 is an explanatory drawing showing another example of the mapping in which different mapping rules are applied to the advance wave and the delayed wave;

EMBODIMENTS OF THE INVENTION

Hereafter, in order to explain this invention in greater detail, the preferred embodiments of the present invention will be described with reference to the accompanying drawings.

Embodiment 1

Figure 1:
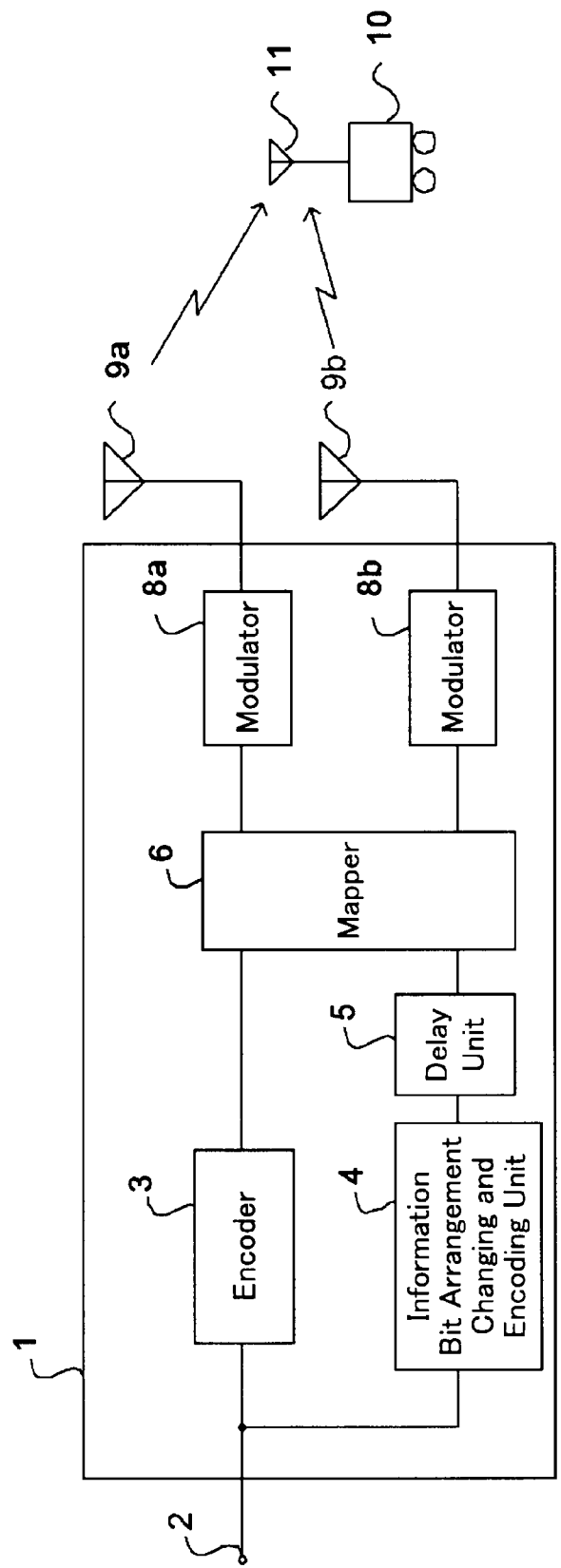
FIG. 1 is a block diagram showing the structure of a radio communication device in accordance with Embodiment 1 of the present invention.

FIG. 1 is a block diagram showing the structure of a radio communication device in accordance with Embodiment 1 of the present invention. As shown in FIG. 1, a transmitter 1 is provided with an information inputting terminal 2, an encoder 3, an information bit arrangement changing and encoding unit 4, a delay unit 5, a mapper 6, an information bit arrangement changing mapper 7, modulators 8a and 8b, and antennas 9a and 9b for the transmitter. A radio signal transmitted from the transmitter 1 is received by a mobile station 10 which is a receiver. The mobile station 10 is provided with an antenna 11 for the mobile station.

An information bit sequence inputted from the information inputting terminal 2 of the transmitter 1 is inputted to the encoder 3, and is encoded by this encoder. The same information bit sequence is inputted also to the encoder 4. The encoder 4 encodes the inputted information bit sequence while changing the arrangement of the information bit sequence which will be mentioned later with reference to FIGS. 2 to 7. The information bit sequence encoded by the encoder 4 is delayed by one symbol with respect to an advance wave by the delay unit 5. A signal point mapping of the information bit sequence encoded by the encoder 3 and the information bit sequence which is encoded by the encoder 4 and is then delayed by the delay unit 5 is carried out by the mapper 6.

The modulator 8a performs a DQPSK modulation on the information bit sequence encoded by the encoder 3. The modulator 8b performs a π/4-shift DQPSK modulation on the information bit sequence encoded by the encoder 4. The information bit sequence which is encoded by the encoder 3 and on which the DQPSK modulation is performed by the modulator 8a is transmitted from the antenna 9a as an advance wave. Furthermore, the information bit sequence which is encoded by the encoder 4 and on which the π/4-shift DQPSK modulation is performed by the modulator 8b is transmitted from the antenna 9b as a delayed wave which is delayed by one symbol with respect to the advance wave.

Figure 2:
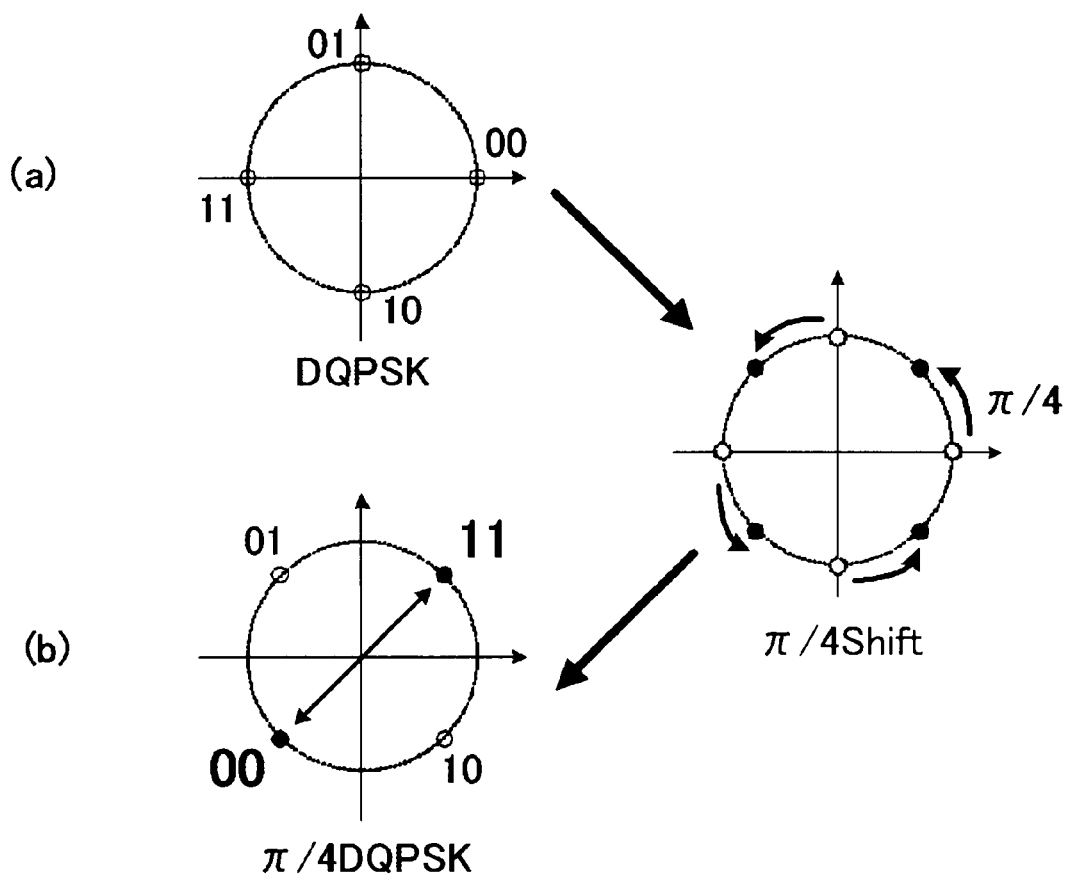
FIG. 2 is an explanatory drawing showing an example of a mapping in which different mapping rules are applied to an advance wave and a delayed wave.

FIG. 2 is an explanatory drawing showing an example of the mapping in which different mapping rules are applied to the advance wave and the delayed wave. The explanatory drawing shown in FIG. 2 is a signal space diagram in which signal points are plotted on a complex plane on which an in-phase signal is placed on a horizontal axis (a real number axis: an I-axis), and a 90 Kout of phase (quadrature-phase) signal is placed on a vertical axis (an imaginary number axis: a Q-axis). Four points "00", "01", "10", and "11" which are plotted in the view show signal points (constellation points). These signal points are also called symbols, and two bits can be encoded for each symbol. FIG. 2(a) shows an example of the mapping of the advance wave on which the DQPSK modulation is performed, and FIG. 2(b) shows an example of the mapping of the delayed wave on which the π/4-shift DQPSK modulation is performed.

The delayed wave of FIG. 2(b) on which the π/4-shift DQPSK modulation is performed follows a mapping rule of shifting each of the signal points of the advance wave of FIG. 2(a) on which the DQPSK modulation is performed by π/4, and then interchanging the signal point "00" positioned in the first quadrant and the signal point "11" positioned in the third quadrant. By applying this mapping rule, even if the mapping of the DQPSK modulated signal (advance wave) is rotated, this mapping does not match the π/4-shift DQPSK modulated signal (delayed wave).

Figure 3:
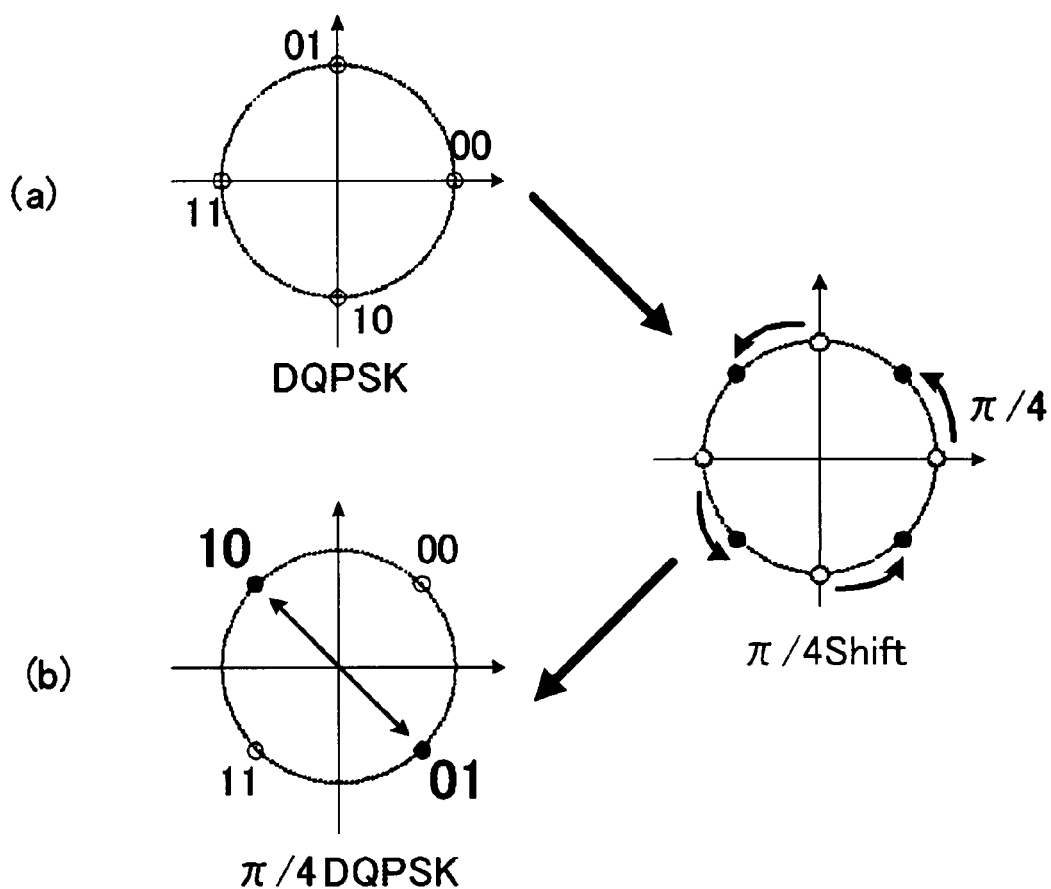
FIG. 3 is an explanatory drawing showing another example of the mapping in which different mapping rules are applied to the advance wave and the delayed wave.

Furthermore, the following mapping rule can be applied to the π/4-shift DQPSK modulated signal which is the delayed wave. FIG. 3 is an explanatory drawing showing another example of the mapping in which different mapping rules are applied to the advance wave and the delayed wave. Because the explanatory drawing shown in FIG. 3 is similar to that shown in FIG. 2, the detailed explanation of FIG. 3 will be omitted hereafter. The delayed wave of FIG. 3(b) on which the π/4-shift DQPSK modulation is performed follows a mapping rule of shifting each of the signal points of the advance wave of FIG. 3(a) on which the DQPSK modulation is performed by π/4, and then interchanging the signal point "01" positioned in the second quadrant and the signal point "10" positioned in the fourth quadrant. By applying this mapping rule, even if the mapping of the DQPSK modulated signal (advance wave) is rotated, this mapping does not match the π/4-shift DQPSK modulated signal (delayed wave).

Figure 4:
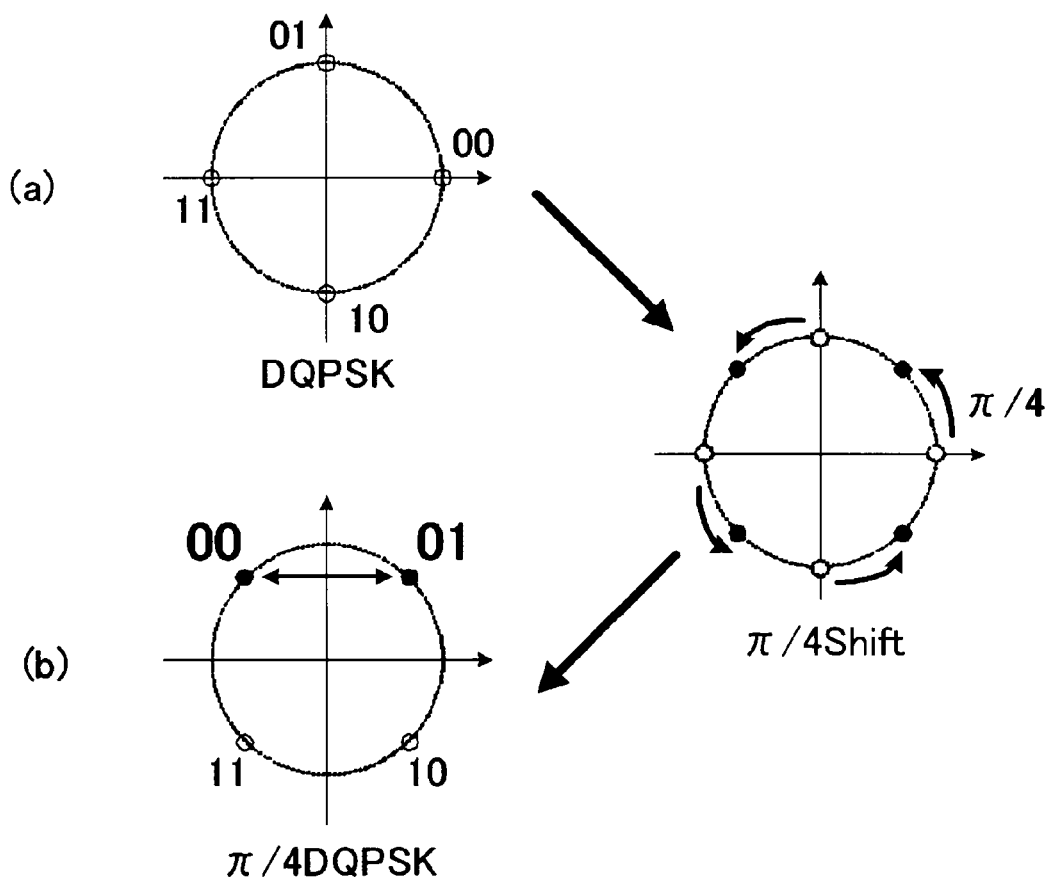
FIG. 4 is an explanatory drawing showing another example of the mapping in which different mapping rules are applied to the advance wave and the delayed wave.

Furthermore, the following mapping rule can be applied to the π/4-shift DQPSK modulated signal which is the delayed wave. FIG. 4 is an explanatory drawing showing another example of the mapping in which different mapping rules are applied to the advance wave and the delayed wave. Because the explanatory drawing shown in FIG. 4 is similar to that shown in FIG. 2, the detailed explanation of FIG. 4 will be omitted hereafter. The delayed wave of FIG. 4(b) on which the π/4-shift DQPSK modulation is performed follows a mapping rule of shifting each of the signal points of the advance wave of FIG. 4(a) on which the DQPSK modulation is performed by π/4, and then interchanging the signal point "00" positioned in the first quadrant and the signal point "01" positioned in the second quadrant. By applying this mapping rule, even if the mapping of the DQPSK modulated signal (advance wave) is rotated, this mapping does not match the π/4-shift DQPSK modulated signal (delayed wave).

Figure 5:
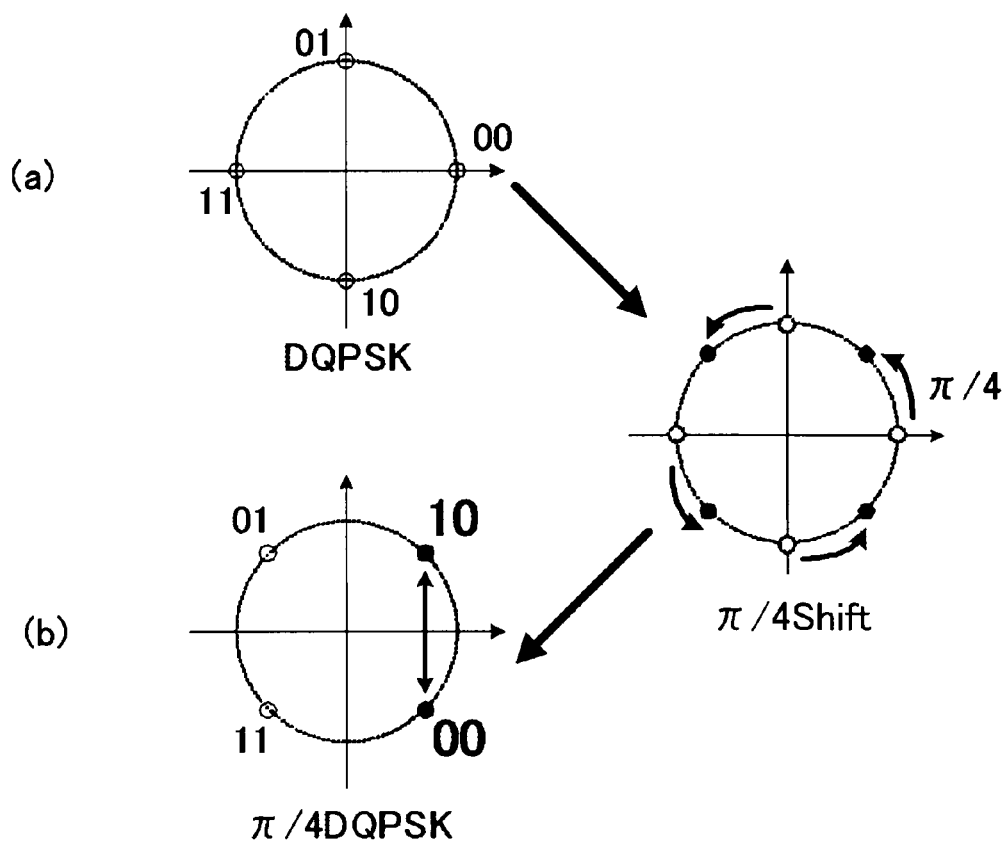
FIG. 5 is an explanatory drawing showing another example of the mapping in which different mapping rules are applied to the advance wave and the delayed wave.

Furthermore, the following mapping rule can be applied to the π/4-shift DQPSK modulated signal which is the delayed wave. FIG. 5 is an explanatory drawing showing another example of the mapping in which different mapping rules are applied to the advance wave and the delayed wave. Because the explanatory drawing shown in FIG. 5 is similar to that shown in FIG. 2, the detailed explanation of FIG. 5 will be omitted hereafter. The delayed wave of FIG. 5(b) on which the π/4-shift DQPSK modulation is performed follows a mapping rule of shifting each of the signal points of the advance wave of FIG. 5(a) on which the DQPSK modulation is performed by π/4, and then interchanging the signal point "00" positioned in the first quadrant and the signal point "10" positioned in the fourth quadrant. By applying this mapping rule, even if the mapping of the DQPSK modulated signal (advance wave) is rotated, this mapping does not match the π/4-shift DQPSK modulated signal (delayed wave).

Figure 6:
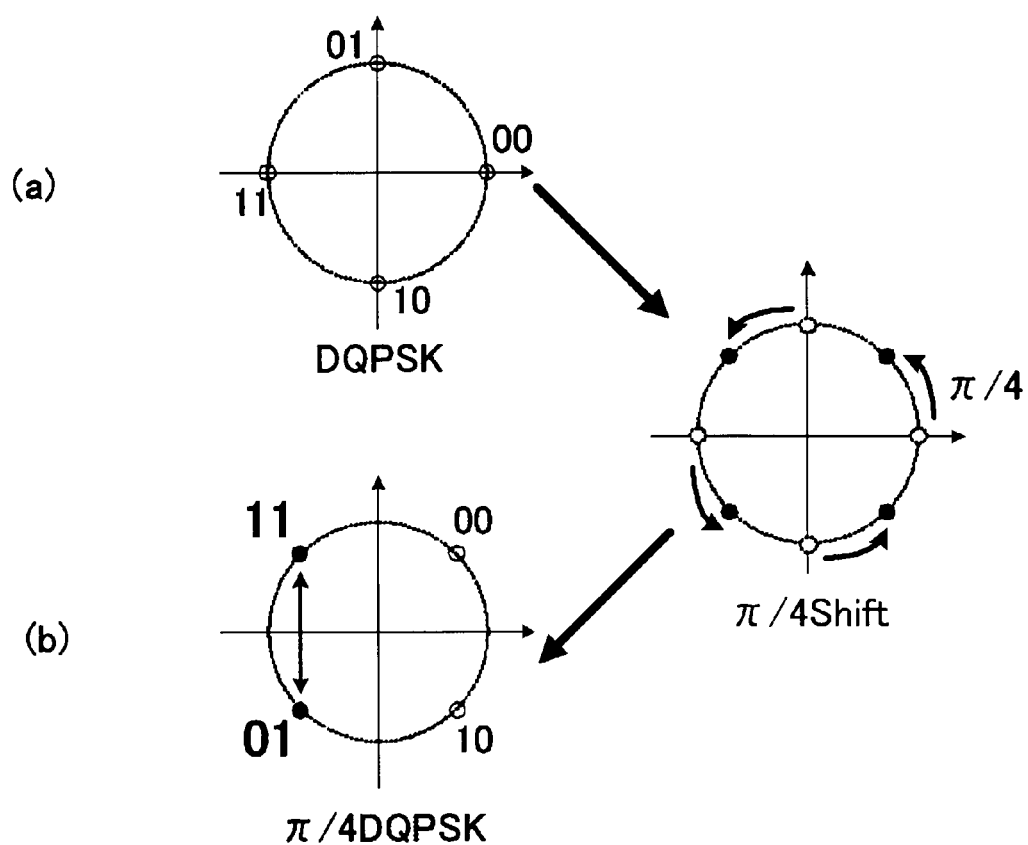
FIG. 6 is an explanatory drawing showing another example of the mapping in which different mapping rules are applied to the advance wave and the delayed wave.

Furthermore, the following mapping rule can be applied to the π/4-shift DQPSK modulated signal which is the delayed wave. FIG. 6 is an explanatory drawing showing another example of the mapping in which different mapping rules are applied to the advance wave and the delayed wave. Because the explanatory drawing shown in FIG. 6 is similar to that shown in FIG. 2, the detailed explanation of FIG. 6 will be omitted hereafter. The delayed wave of FIG. 6(b) on which the π/4-shift DQPSK modulation is performed follows a mapping rule of shifting each of the signal points of the advance wave of FIG. 6(a) on which the DQPSK modulation is performed by π/4, and then interchanging the signal point "01" positioned in the second quadrant and the signal point "11" positioned in the third quadrant. By applying this mapping rule, even if the mapping of the DQPSK modulated signal (advance wave) is rotated, this mapping does not match the π/4-shift DQPSK modulated signal (delayed wave).

Figure 7:
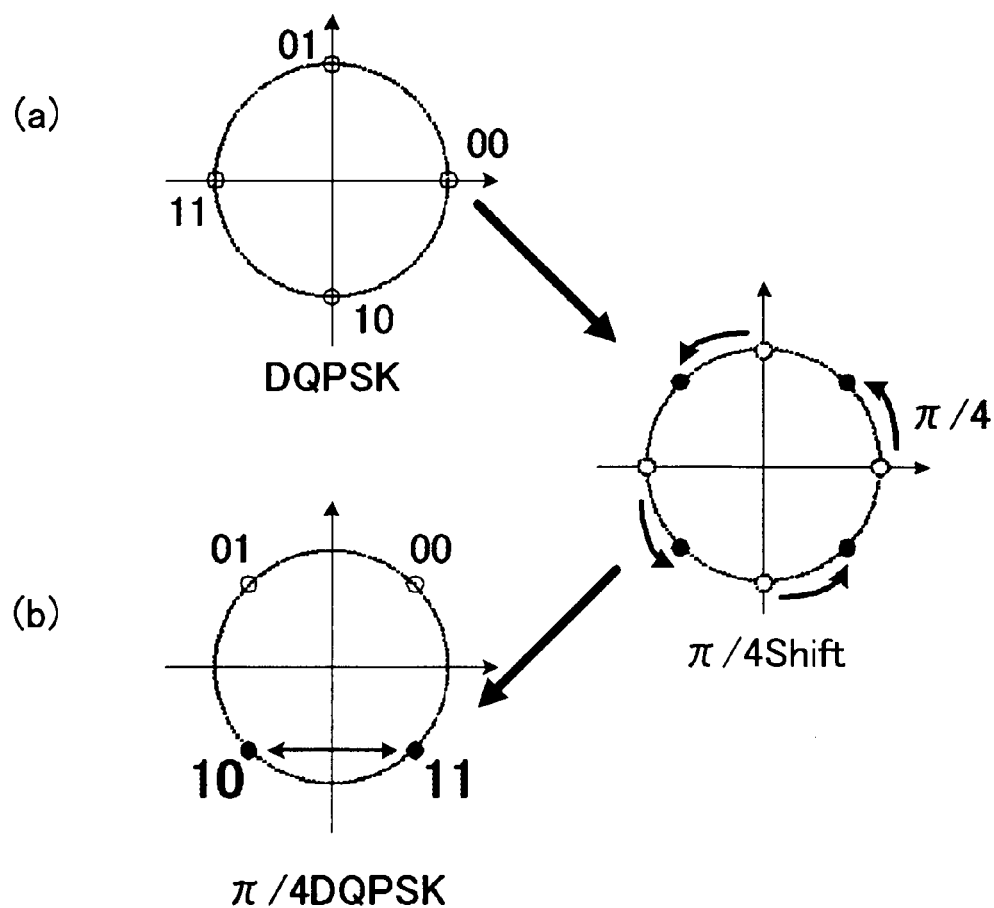
FIG. 7 is an explanatory drawing showing another example of the mapping in which different mapping rules are applied to the advance wave and the delayed wave.

Furthermore, the following mapping rule can be applied to the π/4-shift DQPSK modulated signal which is the delayed wave. FIG. 7 is an explanatory drawing showing another example of the mapping in which different mapping rules are applied to the advance wave and the delayed wave. Because the explanatory drawing shown in FIG. 7 is similar to that shown in FIG. 2, the detailed explanation of FIG. 7 will be omitted hereafter. The delayed wave of FIG. 7(b) on which the π/4-shift DQPSK modulation is performed follows a mapping rule of shifting each of the signal points of the advance wave of FIG. 7(a) on which the DQPSK modulation is performed by π/4, and then interchanging the signal point "11" positioned in the third quadrant and the signal point "10" positioned in the fourth quadrant. By applying this mapping rule, even if the mapping of the DQPSK modulated signal (advance wave) is rotated, this mapping does not match the π/4-shift DQPSK modulated signal (delayed wave).

As previously explained, by applying either one of the mapping rules shown in FIGS. 2 to 7, even if the mapping of the DQPSK modulated signal (advance wave) is rotated, the mapping does not match the π/4-shift DQPSK modulated signal (delayed wave). More specifically, because the receive side can discriminate between the advance wave and the delayed wave even when a frequency deviation of 12.5% occurs in the DQPSK modulated signal which is the advance wave on the transmission line, there is provided an advantage of being able to avoid erroneous estimation of the modulation method and the frequency deviation, and being able to prevent a failure from occurring in the PSP demodulation process performed by the receive side. Furthermore, the frequency deviation permissible range can be enlarged because the mapping of the DQPSK modulated signal (advance wave) does not match the π/4-shift DQPSK modulated signal (delayed wave) by applying different mapping rules to the advance wave and the delayed wave even if the mapping of the DQPSK modulated signal is rotated.

Embodiment 2

Figure 8:
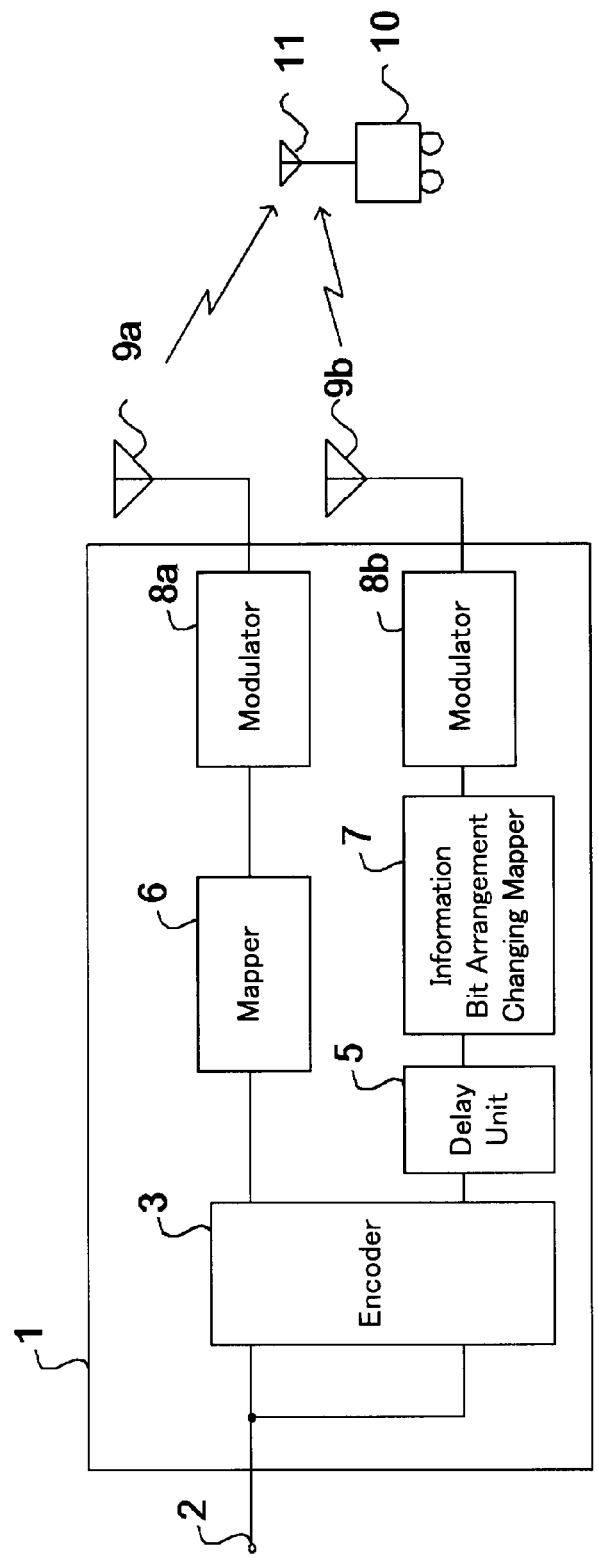
FIG. 8 is a block diagram showing the structure of a radio communication device in accordance with Embodiment 2 of the present invention.

FIG. 8 is a block diagram showing the structure of a radio communication device in accordance with Embodiment 2 of the present invention. In FIG. 8, because the same reference numerals as those shown in FIG. 1 denote the same components or like components, the explanation of the components will be omitted hereafter. In the radio communication device shown in FIG. 1, the encoder 4 encodes an information bit sequence inputted from the information inputting terminal 2, and changes the arrangement of the information bit sequence encoded thereby according to either one of the mapping rules shown in FIGS. 2 to 7. As an alternative, the process of changing the arrangement of the information bit sequence according to either one of the mapping rules shown in FIGS. 2 to 7 can be carried out not by the encoder, but by a mapper 7 (information bit arrangement changing mapper). Furthermore, this embodiment can be applied to a process of changing the arrangement of an information bit sequence according to either one of mapping rules shown in FIGS. 17 to 19 in Embodiment 5 which will be mentioned later. Even the use of this structure can provide the same advantages as those provided by the radio communication device in accordance with Embodiment 1 or 5.

Embodiment 3

Because the PADM (Per transmit Antenna Differential Mapping) transmission diversity is a communication method of performing a differential modulation different for each transmit antenna on identical data to transmit this data, the PADM transmission diversity can be implemented by using not only a method of performing a different differential modulation process for each of a plurality of antennas disposed in a single transmitter, but also a method of performing a different differential modulation process for each transmitter. Hereafter, a structure in which a transceiver which transmits an advance wave and a transceiver which transmits a delayed wave, among a plurality of transceivers positioned at a physical distance from one another, transmit their respective waves in synchronization with each other will be explained.

Figure 9:
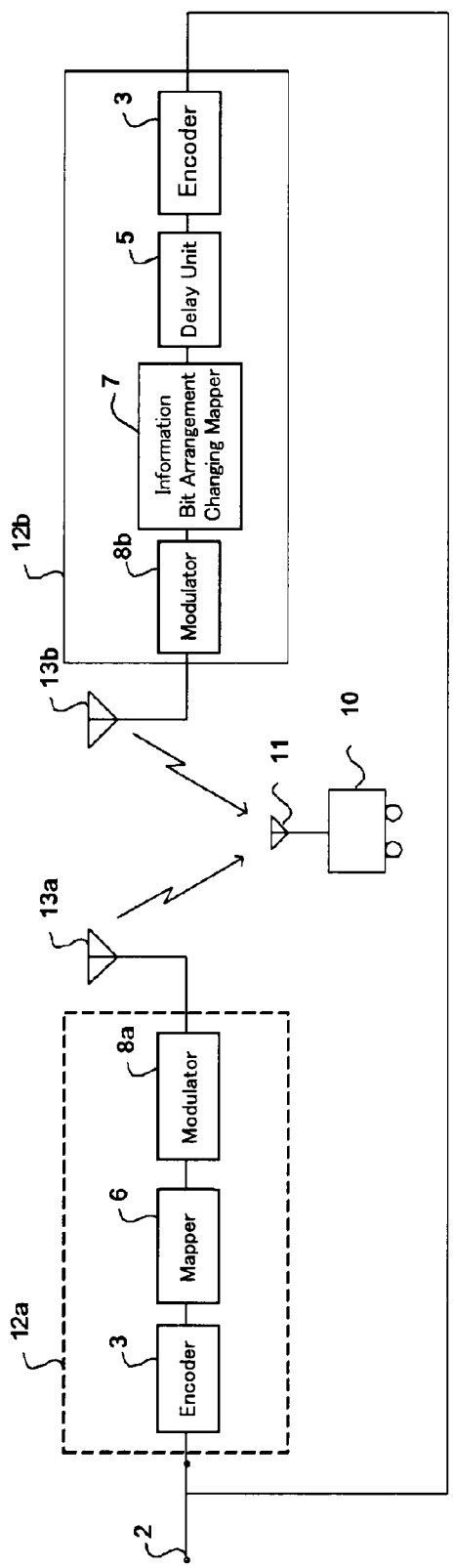
FIG. 9 is a block diagram showing the structure of a radio communication device in accordance with Embodiment 3 of the present invention.

FIG. 9 is a block diagram showing the structure of a radio communication device in accordance with Embodiment 3 of the present invention. As shown in FIG. 9, the transmitter 12a for advance wave is provided with an encoder 3, a mapper 6, a modulator 8a, and an antenna 13a for the transmitter. On the other hand, the transmitter 12b for delayed wave is provided with an encoder 3, a delay unit 5, an information bit arrangement changing mapper 7, a modulator 8b, and an antenna 13b for the transmitter.

The transmitter 12a for advance wave and the transmitter 12b for delayed wave are disposed at a physical distance from each other, and are connected to each other via a communication channel (optical fiber or the like) for transmitting an information bit sequence inputted from an information input terminal 2 to the transmitter 12a for advance wave to the transmitter 12b for delayed wave. The transmitter 12a for advance wave and the transmitter 12b for delayed wave are implemented as base stations, for example. Furthermore, a mobile station 10 can be a mobile phone or communication equipment mounted in a moving object such as a train. In FIG. 9, because the same reference numerals as those shown in FIG. 1 denote the same components or like components, the explanation of the components will be omitted hereafter.

The information bit sequence inputted from the information inputting terminal 2 to the transmitter 12a for advance wave is inputted also to the transmitter 12b for delayed wave via the communication channel. The transmitter 12a for advance wave transmits the information bit sequence on which the transmitter performs a DQPSK modulation. Furthermore, the transmitter 12b for delayed wave delays the same information bit sequence as that inputted to the transmitter 12a for advance wave by one symbol by using the delay unit 5. The information bit arrangement changing mapper 7 then changes the arrangement of the information bit sequence according to either one of the mapping rules shown in FIGS. 2 to 7.

The modulator 8b performs a π/4-shift DQPSK modulation on this information bit sequence. After carrying out the above-mentioned process, the transmitter 12b for delayed wave transmits the information bit sequence on which the transmitter performs the π/4-shift DQPSK modulation. Because the transmitter 12b for delayed wave transmits the signal which is delayed by one symbol with respect to the information sequence transmitted by the transmitter 12a for advance wave, the mobile station 10 which is the receive side recognizes the signal which has come from the transmitter 12a for advance wave as an advance wave, and also recognizes the signal which has come from the transmitter 12b for delayed wave as a delayed wave, and carries out a receiving process including estimation of a frequency error and PSP demodulation.

Although in the above-mentioned example the case in which this embodiment is applied to the structure in accordance with Embodiment 1 is explained, this embodiment can be applied to the structure in accordance with Embodiment 5 which will be mentioned later. More specifically, the transmitter 12a for advance wave transmits an information bit sequence on which the transmitter performs a D8PSK modulation, and the information bit arrangement changing mapper 7 of the transmitter 12b for delayed wave changes the arrangement of the information bit sequence according to either one of mapping rules shown in FIGS. 17 to 19 which will be mentioned later. The modulator 8b then performs a π/8-shift D8PSK modulation on this information bit sequence. After carrying out the above-mentioned process, the transmitter 12b for delayed wave transmits the information bit sequence on which the transmitter performs the π/8-shift D8PSK modulation.

Thus, even when transmitters located at a physical distance from each other individually transmit signals respectively corresponding to an advance wave and a delayed wave in synchronization with each other, there can be provided the same advantages as those provided by Embodiment 1 or 5. Furthermore, by transmitting an advance wave and a delayed wave from two different base stations, there is provided an advantage of being able to reduce the influence of the multipath because the paths via which the radio waves from the base stations reach a mobile station differ from each other.

Embodiment 4

PADM transmission implements time space diversity by transmitting a DQPSK (Differential quadrature phase shift keying) modulated signal from one antenna as an advance wave and also transmitting a π/4-shift DQPSK modulated signal whose transmission timing is delayed by one symbol as a delayed wave from another antenna for identical data (an identical information sequence). A problem is, however, that when only the π/4-shift DQPSK modulated signal which is a delayed wave, among the DQPSK modulated signal which is an advance wave and the π/4-shift DQPSK modulated signal which is a delayed wave, is blocked, and a frequency deviation (a deviation of 12.5% at a symbol normalized frequency) occurs in the DQPSK modulated signal which is an advance wave, a receive side cannot discriminate between the advance wave and the delayed wave, and hence cannot estimate a frequency error and perform a demodulation because the DQPSK modulated signal which is the advance wave matches the mapping of the π/4-shift DQPSK modulated signal which is the delayed wave.

In Embodiment 1, for example, as shown in FIG. 2(b), by applying the mapping rule of interchanging the signal point "00" positioned in the first quadrant and the signal point "11" positioned in the third quadrant, among the four signal points "00", "01", "10", and "11" on the complex plane of the π/4-shift DQPSK modulated signal which is the delayed wave to change the arrangement of the information sequence, the DQPSK modulated signal (advance wave) is made not to match the π/4-shift DQPSK modulated signal (delayed wave) even if the mapping of the DQPSK modulated signal is rotated. By using this structure, because the receive side can discriminate between the advance wave and the delayed wave even if a frequency deviation of 12.5% occurs in the DQPSK modulated signal which is the advance wave on the transmission line, there is provided an advantage of being able to avoid erroneous estimation of the modulation method and the frequency deviation, and being able to prevent a failure from occurring in the PSP demodulation process performed by the receive side.

However, there can be considered a case in which when only the DQPSK modulated signal which is the advanced wave, among the DQPSK modulated signal which is the advance wave and the π/4-shift DQPSK modulated signal which is the delayed waves, is blocked, only the delayed wave (π/4-shift DQPSK modulated signal) arrives at the receive side. At this time, when a symbol normalized frequency offset having a deviation of 12.5% occurs in the π/4-shift DQPSK modulated signal which is the delayed wave on the transmission line, there arises a problem that the DQPSK modulated signal which is the advance wave matches the mapping of the π/4-shift DQPSK modulated signal which is the delayed wave. Therefore, it is necessary to interchange signal points of the information sequence which is the advance wave to enable the receive side to discriminate between the advance wave and the delayed wave. To begin with, unless the mapping of the DQPSK modulated signal (advance wave) matches the mapping of the π/4-shift DQPSK modulated signal (delayed wave) even if they are rotated with respect to each other, the target whose arrangement of the information sequence must be changed is not necessarily the delayed wave.

Figure 10:
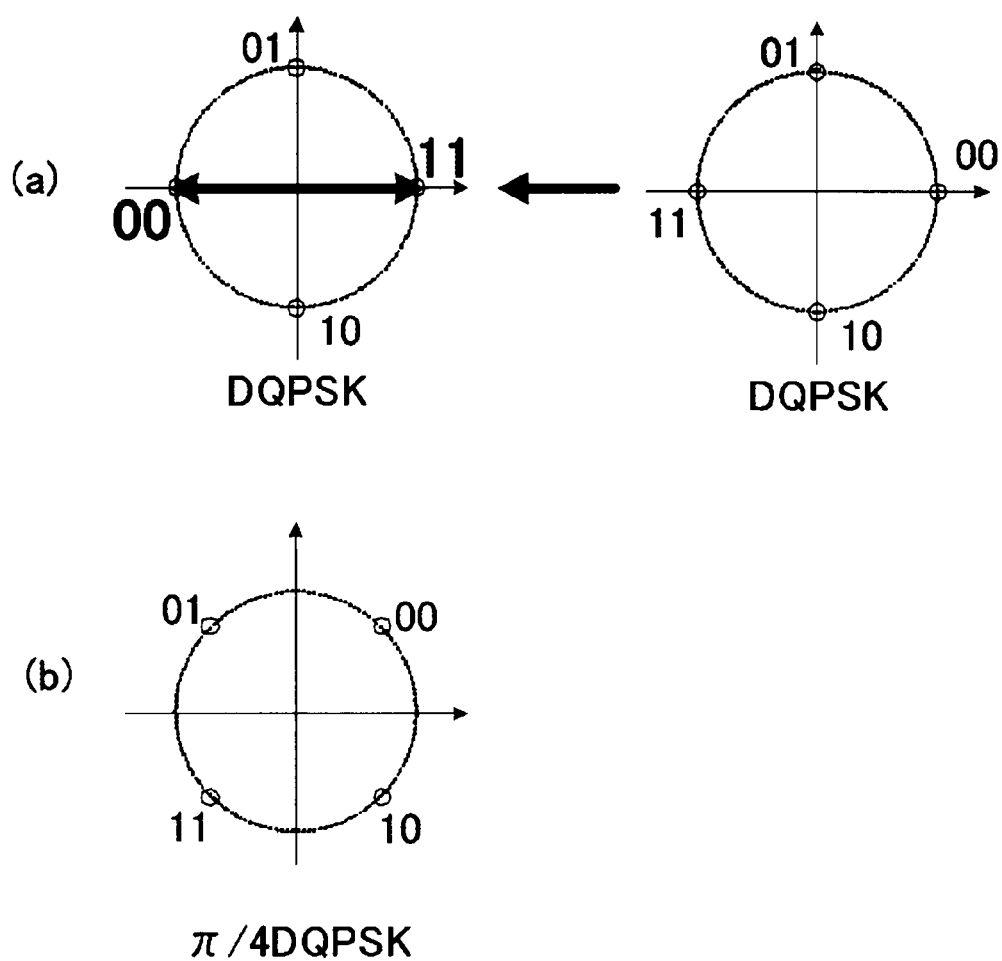
FIG. 10 is an explanatory drawing showing an example of a mapping in which different mapping rules are applied to an advance wave and a delayed wave.

Therefore, an example of changing the arrangement of the information sequence of the advance wave will be explained hereafter. FIG. 10 is an explanatory drawing showing an example of a mapping in which different mapping rules are applied to the advance wave and the delayed wave. The explanatory drawing shown in FIG. 10 is a signal space diagram in which signal points are plotted on a complex plane on which an in-phase signal is placed on a horizontal axis (a real number axis: an I-axis), and a 90 Kout of phase (quadrature-phase) signal is placed on a vertical axis (an imaginary number axis: a Q-axis). Four points "00", "01", "10", and "11" which are plotted in the view show signal points (constellation points). These signal points are also called symbols, and two bits can be encoded for each symbol. FIG. 10(a) shows an example of the mapping of the advance wave on which the DQPSK modulation is performed, and FIG. 10(b) shows an example of the mapping of the delayed wave on which the π/4-shift DQPSK modulation is performed.

The delayed wave of FIG. 10(a) on which the DQPSK modulation is performed follows a mapping rule of interchanging the signal point "00" positioned on the positive real number axis (I axis, i.e. the horizontal axis in FIG. 10) and the signal point "11" positioned on the negative real number axis. By applying this mapping rule of interchanging the signal points of the information sequence, even if the mapping of the DQPSK modulated signal (advance wave) and the mapping of the π/4-shift DQPSK modulated signal (delayed wave) are rotated, they do not match each other.

Figure 11:
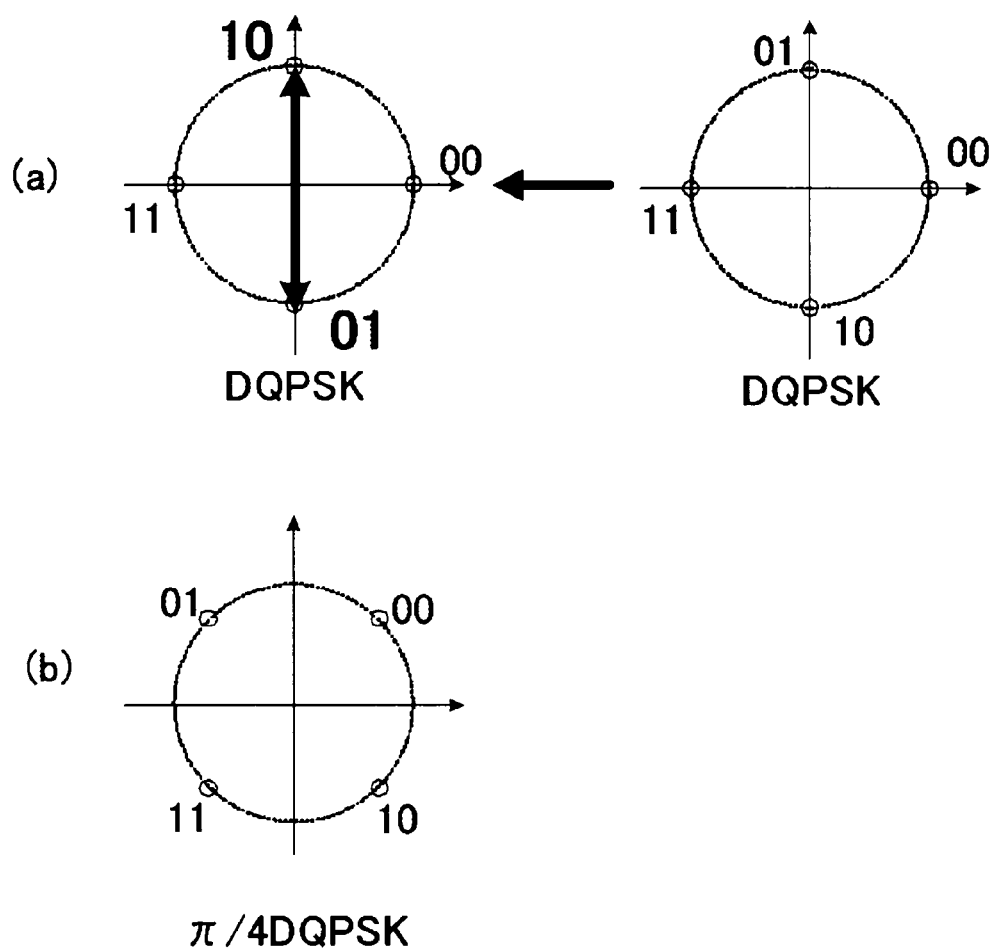
FIG. 11 is an explanatory drawing showing another example of the mapping in which different mapping rules are applied to the advance wave and the delayed wave.

Furthermore, the following mapping rule can be applied to the DQPSK modulated signal which is the advance wave. FIG. 11 is an explanatory drawing showing another example of the mapping in which different mapping rules are applied to the advance wave and the delayed wave. Because the explanatory drawing shown in FIG. 11 is similar to that shown in FIG. 10, the detailed explanation of FIG. 11 will be omitted hereafter. The advance wave of FIG. 11(a) on which the DQPSK modulation is performed follows a mapping rule of interchanging the signal point "01" positioned on the positive imaginary number axis (Q axis, i.e. the vertical axis in FIG. 11) and the signal point "10" positioned on the negative imaginary number axis, among the signal points of the advance wave. By applying this mapping rule, even if the mapping of the DQPSK modulated signal (advance wave) and the mapping of the π/4-shift DQPSK modulated signal (delayed wave) are rotated, they do not match each other.

Figure 12:
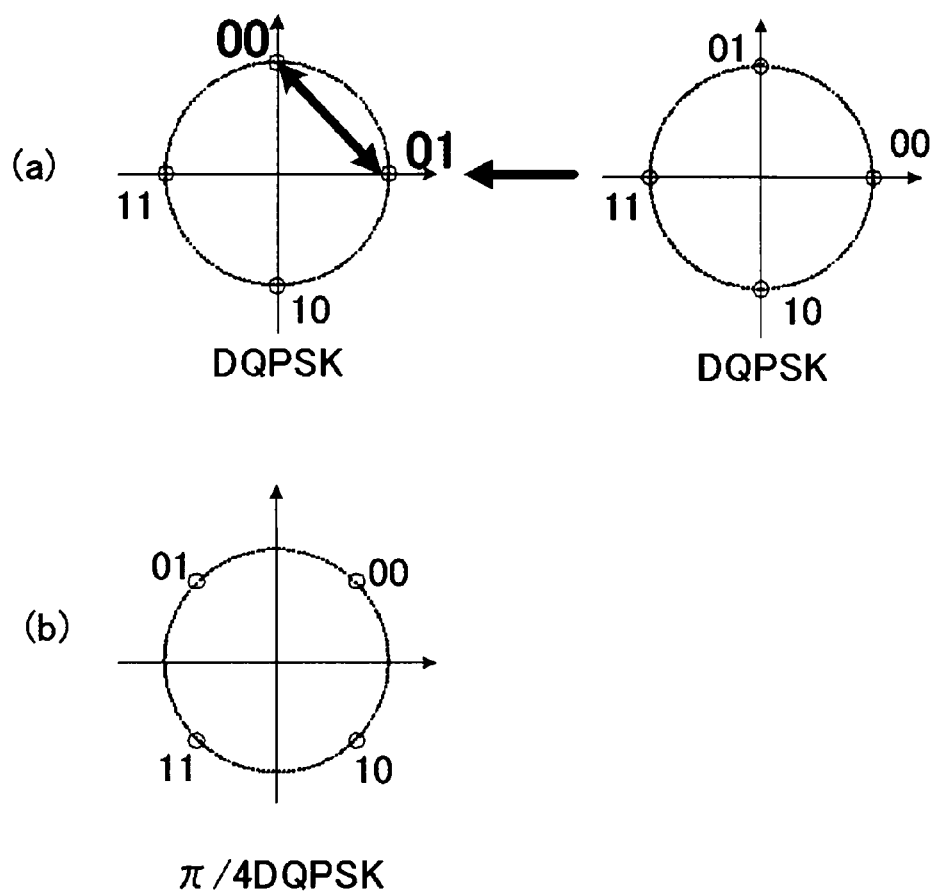
FIG. 12 is an explanatory drawing showing another example of the mapping in which different mapping rules are applied to the advance wave and the delayed wave.

Furthermore, the following mapping rule can be applied to the DQPSK modulated signal which is the advance wave. FIG. 12 is an explanatory drawing showing another example of the mapping in which different mapping rules are applied to the advance wave and the delayed wave. Because the explanatory drawing shown in FIG. 12 is similar to that shown in FIG. 10, the detailed explanation of FIG. 12 will be omitted hereafter. The advance wave of FIG. 12(a) on which the DQPSK modulation is performed follows a mapping rule of interchanging the signal point "00" positioned on the positive real number axis (I axis, i.e. the vertical axis in FIG. 12) and the signal point "01" positioned on the positive imaginary number axis, among the signal points of the advance wave. By applying this mapping rule, even if the mapping of the DQPSK modulated signal (advance wave) and the mapping of the π/4-shift DQPSK modulated signal (delayed wave) are rotated, they do not match each other.

Figure 13:
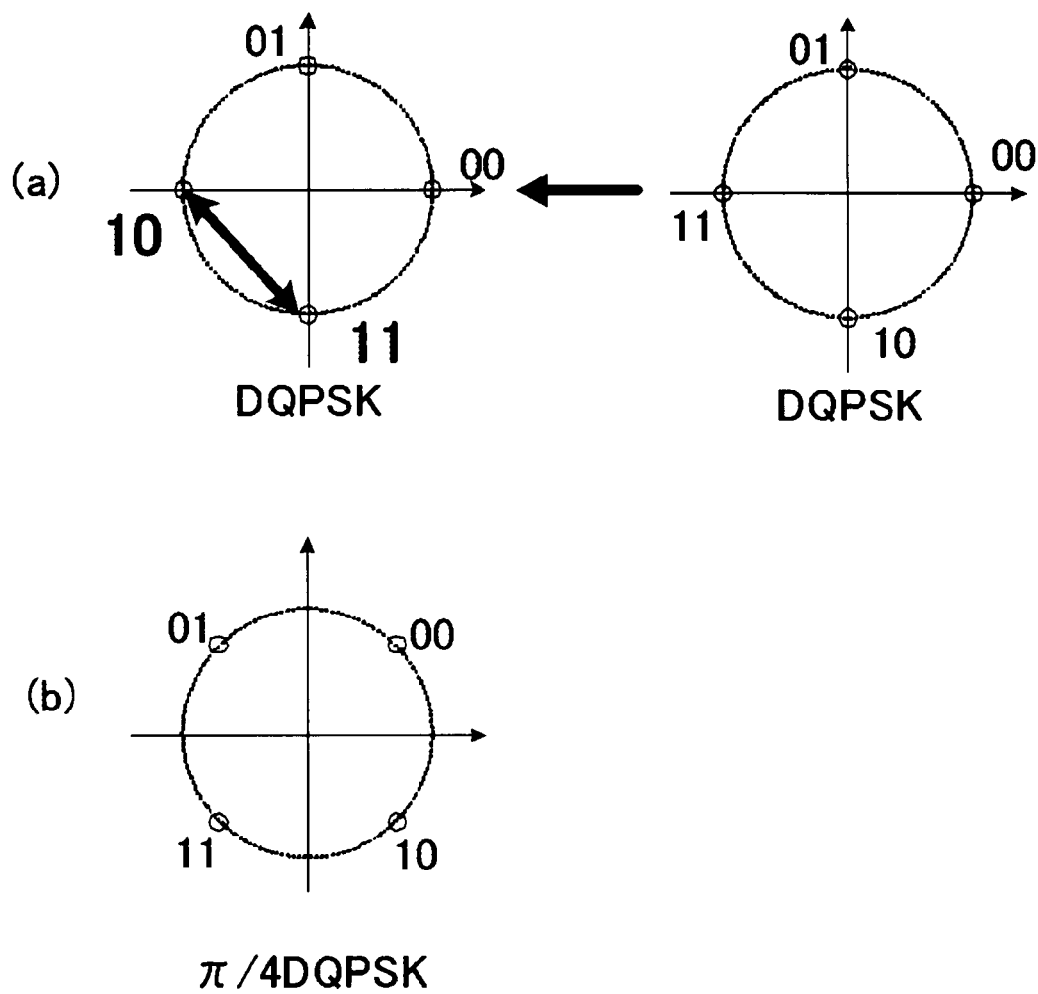
FIG. 13 is an explanatory drawing showing another example of the mapping in which different mapping rules are applied to the advance wave and the delayed wave.

Furthermore, the following mapping rule can be applied to the DQPSK modulated signal which is the advance wave. FIG. 13 is an explanatory drawing showing another example of the mapping in which different mapping rules are applied to the advance wave and the delayed wave. Because the explanatory drawing shown in FIG. 13 is similar to that shown in FIG. 10, the detailed explanation of FIG. 13 will be omitted hereafter. The advance wave of FIG. 13(a) on which the DQPSK modulation is performed follows a mapping rule of interchanging the signal point "11" positioned on the negative real number axis (I axis, i.e. the horizontal axis in FIG. 13) and the signal point "10" positioned on the negative imaginary number axis (Q axis, i.e. the vertical axis in FIG. 13), among the signal points of the advance wave. By applying this mapping rule, even if the mapping of the DQPSK modulated signal (advance wave) and the mapping of the π/4-shift DQPSK modulated signal (delayed wave) are rotated, they do not match each other.

Figure 14:
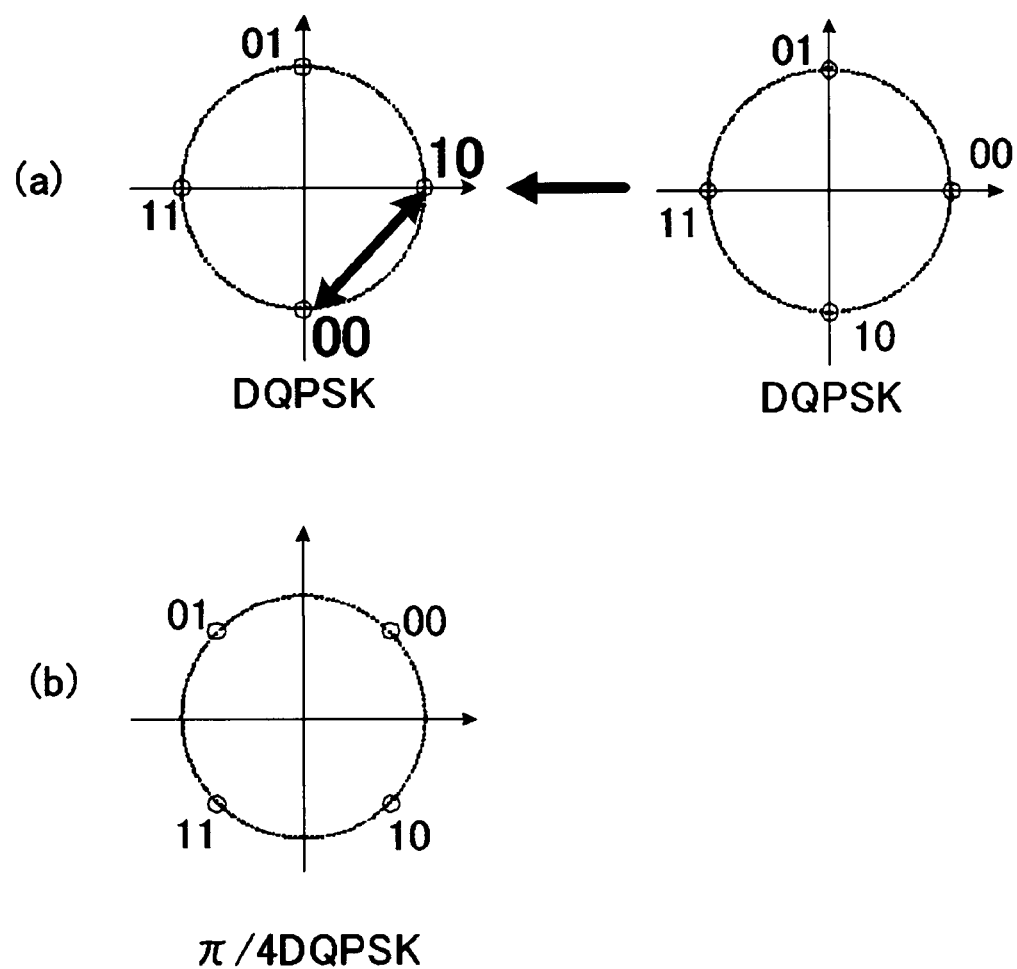
FIG. 14 is an explanatory drawing showing another example of the mapping in which different mapping rules are applied to the advance wave and the delayed wave.
Figure 16:
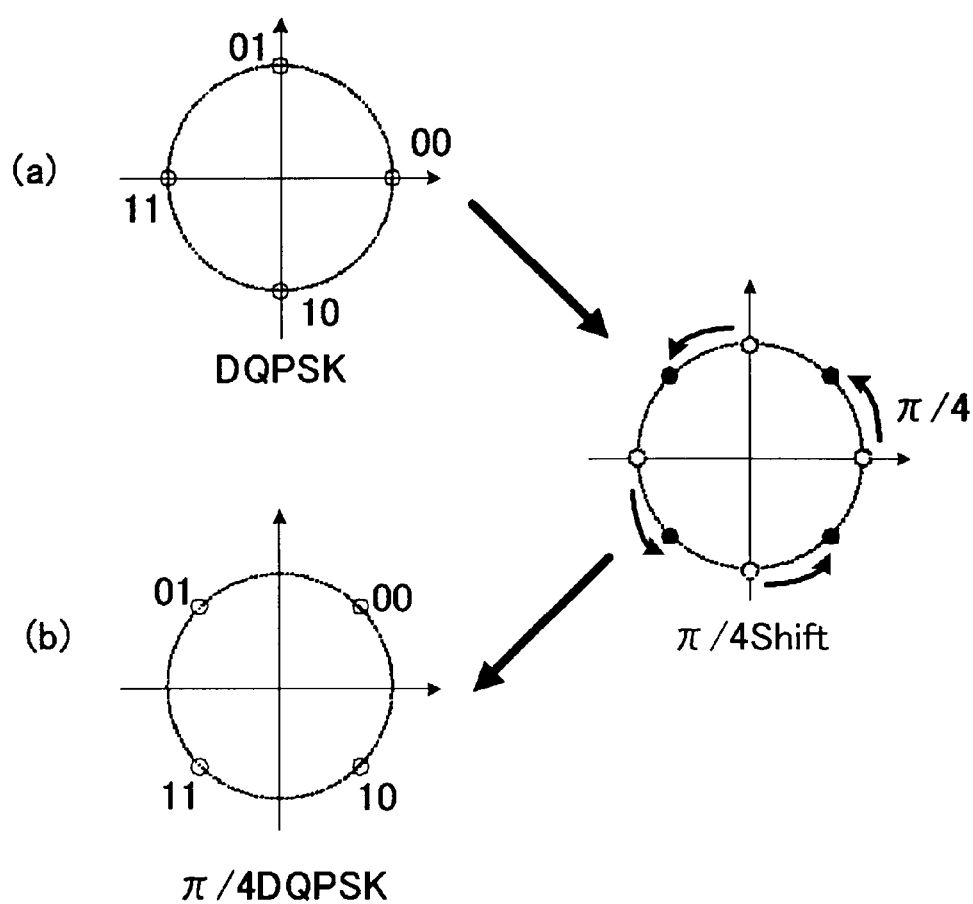
FIG. 16 is an explanatory drawing showing an example of a mapping in which a conventional mapping rule is applied.

Furthermore, the following mapping rule can be applied to the DQPSK modulated signal which is the advance wave. FIG. 14 is an explanatory drawing showing another example of the mapping in which different mapping rules are applied to the advance wave and the delayed wave. Because the explanatory drawing shown in FIG. 14 is similar to that shown in FIG. 10, the detailed explanation of FIG. 14 will be omitted hereafter. The advance wave of FIG. 14(a) on which the DQPSK modulation is performed follows a mapping rule of interchanging the signal point "00" positioned on the positive real number axis (I axis, i.e. the horizontal axis in FIG. 14) and the signal point "10" positioned on the negative imaginary number axis (Q axis, i.e. the vertical axis in FIG. 14), among the signal points of the advance wave. By applying this mapping rule, even if the mapping of the DQPSK modulated signal (advance wave) and the mapping of the π/4-shift DQPSK modulated signal (delayed wave) are rotated, they do not match each other.

Furthermore, the following mapping rule can be applied to the DQPSK modulated signal which is the advance wave. FIG. 15 is an explanatory drawing showing another example of the mapping in which different mapping rules are applied to the advance wave and the delayed wave. Because the explanatory drawing shown in FIG. 15 is similar to that shown in FIG. 10, the detailed explanation of FIG. 15 will be omitted hereafter. The advance wave of FIG. 15(a) on which the DQPSK modulation is performed follows a mapping rule of interchanging the signal point "11" positioned on the negative real number axis (I axis, i.e. the horizontal axis in FIG. 15) and the signal point "01" positioned on the positive imaginary number axis (Q axis, i.e. the vertical axis in FIG. 15), among the signal points of the advance wave. By applying this mapping rule, even if the mapping of the DQPSK modulated signal (advance wave) and the mapping of the π/4-shift DQPSK modulated signal (delayed wave) are rotated, they do not match each other.

As previously explained, by applying either one of the mapping rules shown in FIGS. 10 to 15, even if the mapping of the DQPSK modulated signal (advance wave) and the mapping of the π/4-shift DQPSK modulated signal (delayed wave) are rotated, they do not match each other. More specifically, because the receive side can discriminate between the advance wave and the delayed wave even when a frequency deviation of 12.5% occurs in the π/4-shift DQPSK modulated signal which is the delayed wave on the transmission line, there is provided an advantage of being able to avoid erroneous estimation of the modulation method and the frequency deviation, and being able to prevent a failure from occurring in the PSP demodulation process performed by the receive side. Furthermore, the frequency deviation permissible range can be enlarged by applying different mapping rules to the advance wave and the delayed wave because the mapping of the DQPSK modulated signal (advance wave) does not match the mapping of the π/4-shift DQPSK modulated signal (delayed wave).

Embodiment 5

In above-mentioned Embodiments 1 to 4, the case of transmitting a DQPSK modulated signal (advance wave) and a π/4-shift DQPSK modulated signal (delayed wave) is described. In Embodiment 5, an example in which the present invention is applied to a structure in which time space diversity is implemented by transmitting a D8PSK (Differential 8 phase shift keying) modulated signal as an advance wave from one antenna, and a π/8-shift D8PSK modulated signal whose transmission timing is delayed by one symbol with respect to the advance signal as a delayed wave from another antenna is shown. Because each unit in terms of drawings has the same structure as that shown in FIG. 1 in Embodiment 1, that shown in FIG. 8 in Embodiment 2, or that shown in FIG. 9 in Embodiment 3, the explanation of each unit will be omitted hereafter.

Figure 23:
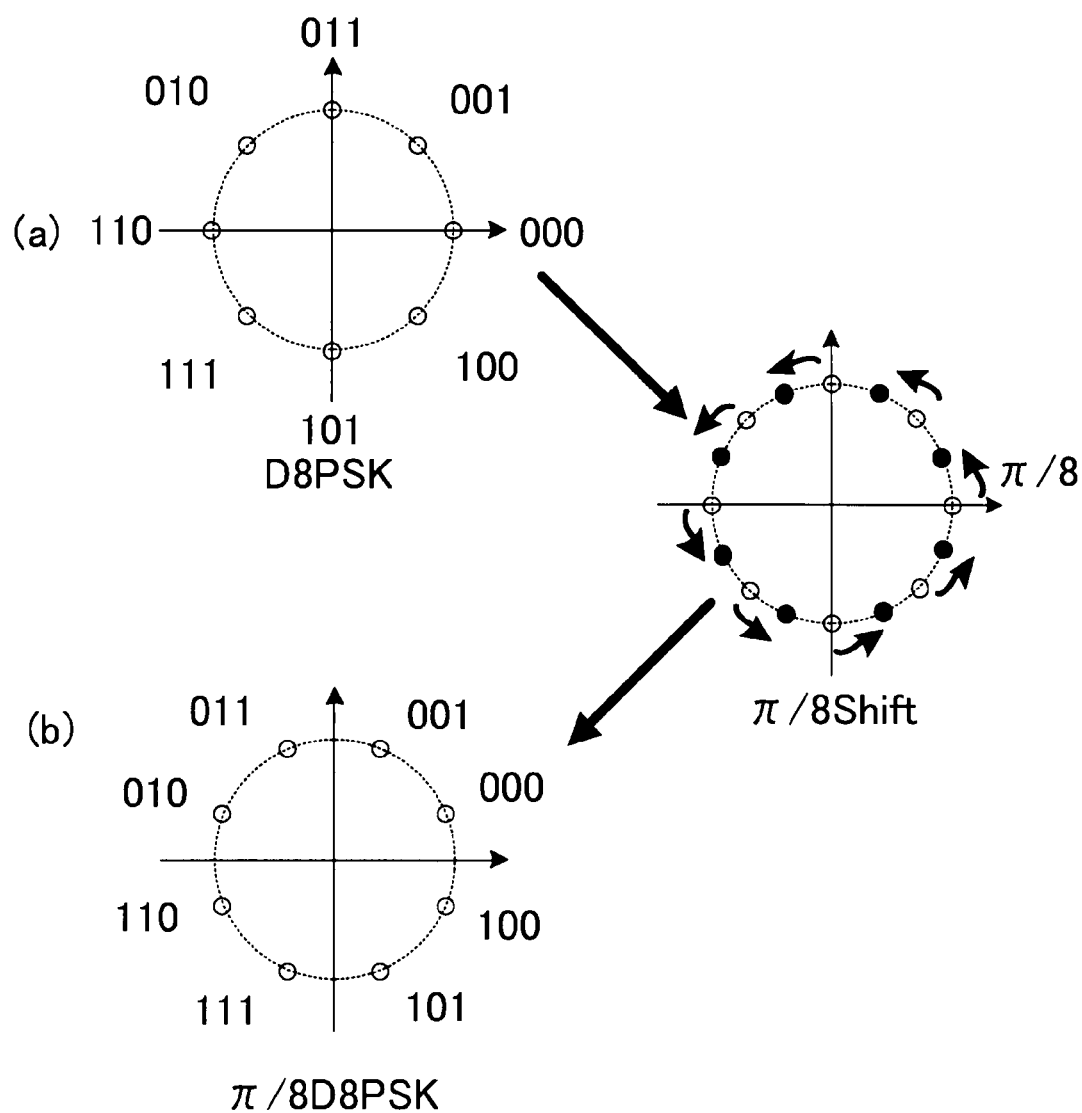
FIG. 23 is an explanatory drawing showing an example of a mapping in which a conventional mapping rule is applied.

FIG. 23 shows an example of the mapping onto a complex plane in the case of transmitting a D8PSK modulated signal (advance wave), and π/8-shift D8PSK modulated signal (delayed wave). FIG. 23(a) shows the D8PSK modulated signal which is an advance wave, and FIG. 23(b) shows the π/8-shift D8PSK modulated signal which is a delayed wave. The explanatory drawing shown in FIG. 23 is a signal space diagram in which signal points are plotted on the complex plane on which an in-phase signal is placed on a horizontal axis (a real number axis: an I-axis), and a 90 Kout of phase (quadrature-phase) signal is placed on a vertical axis (an imaginary number axis: a Q-axis). Eight points "000", "001", "011", "010", "110", "111", "101", and "100" which are plotted in the view show signal points (constellation points). These signal points are also called symbols, and three bits can be encoded for each symbol.

In this case, a problem is that when only the π/8-shift D8PSK modulated signal which is a delayed wave, among the D8PSK modulated signal which is an advance wave and the π/8-shift D8PSK modulated signal which is a delayed wave, is blocked, and a frequency deviation (a deviation of 6.25% at a symbol normalized frequency) occurs in the D8PSK modulated signal which is an advance wave, a receive side cannot discriminate between the advance wave and the delayed wave, and hence cannot estimate a frequency error and perform a demodulation because the D8PSK modulated signal which is the advance wave matches the mapping of the π/8-shift D8PSK modulated signal which is the delayed wave.

Figure 17:
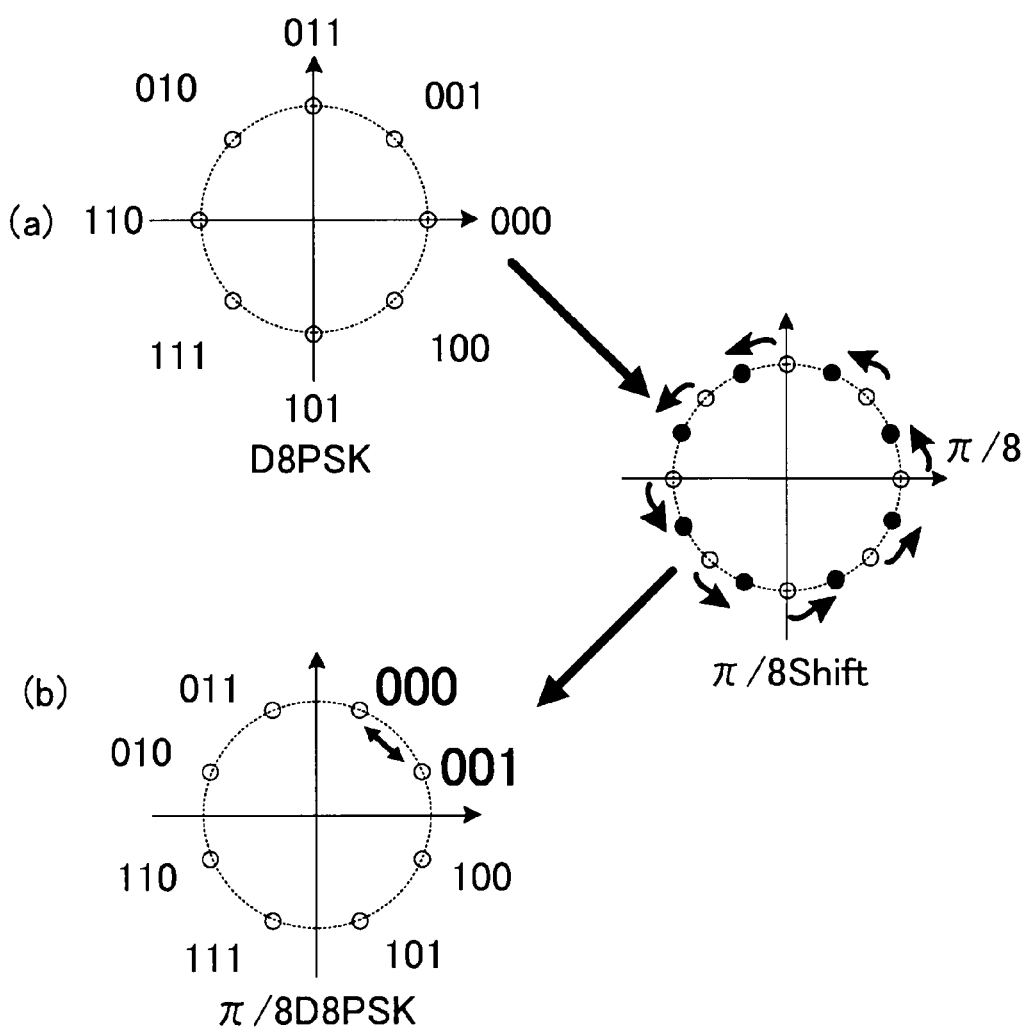
FIG. 17 is an explanatory drawing showing an example of a mapping in which different mapping rules are applied to an advance wave and a delayed wave.

FIG. 17 is an explanatory drawing showing an example of a mapping in accordance with Embodiment 5 in which different mapping rules are applied to an advance wave and a delayed wave at the time of an 8PSK modulation. FIG. 17(a) shows an example of a mapping of an advance wave on which a D8PSK modulation is performed, and FIG. 17(b) shows an example of a mapping of a delayed wave on which a π/8-shift D8PSK modulation is performed. The delayed wave of FIG. 17(b) on which the π/8-shift D8PSK modulation is performed follows a mapping rule of shifting each of the signal points of the D8PSK modulated advance wave of FIG. 17(a) by π/8, and interchanging the signal point "000" and the signal point "001". By applying this mapping rule, even if the mapping of the D8PSK modulated signal (advance wave) is rotated, the mapping of the D8PSK modulated signal does not match the π/8-shift DQPSK modulated signal (delayed wave).

Figure 18:
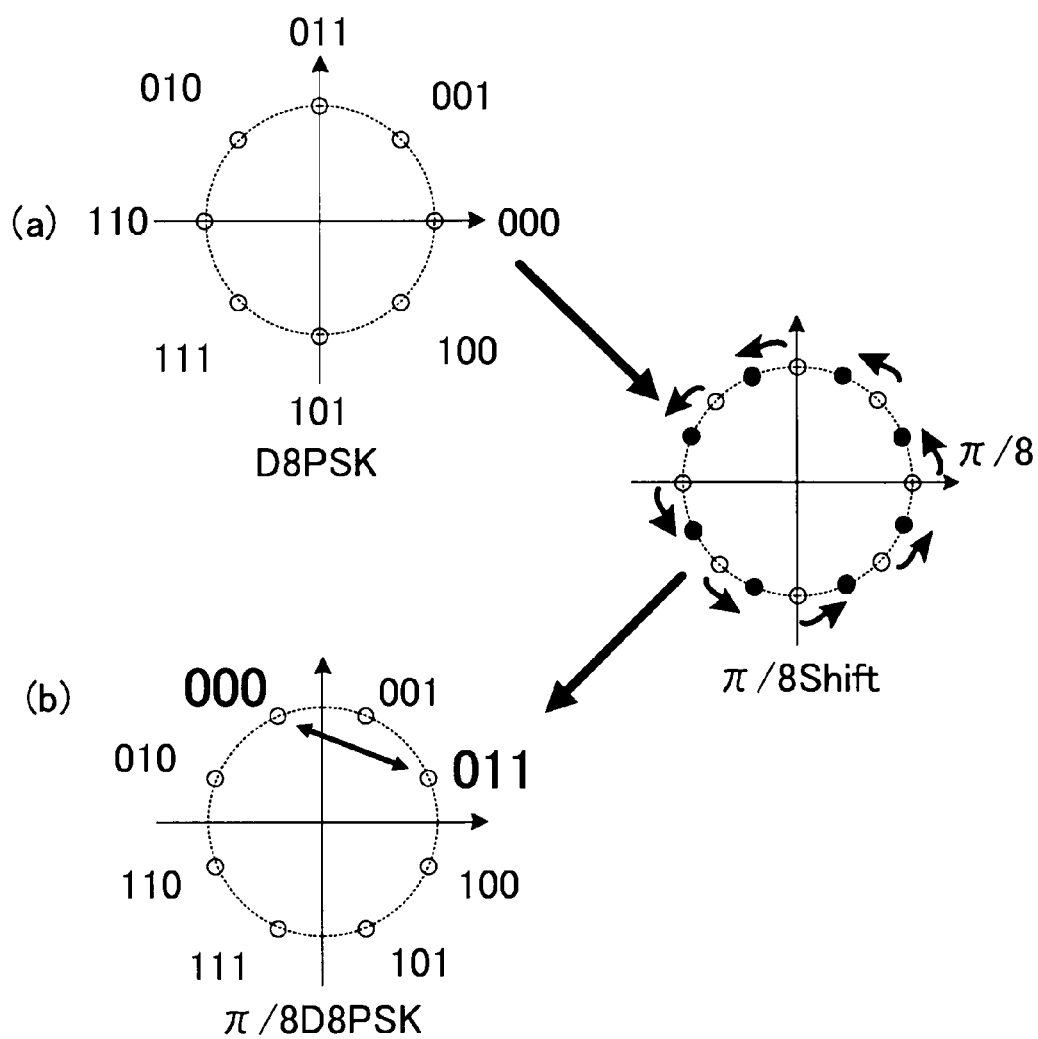
FIG. 18 is an explanatory drawing showing another example of the mapping in which different mapping rules are applied to the advance wave and the delayed wave.

Furthermore, the following mapping rule can be applied to the π/8-shift DQPSK modulated signal which is the delayed wave. FIG. 18 is an explanatory drawing showing another example of the mapping in which different mapping rules are applied to the advance wave and the delayed wave. Because the explanatory drawing shown in FIG. 18 is similar to that shown in FIG. 17, the detailed explanation of FIG. 18 will be omitted hereafter. The delayed wave of FIG. 18(b) on which the π/8-shift D8PSK modulation is performed follows a mapping rule of shifting each of the signal points of the D8PSK modulated advance wave of FIG. 18(a) by π/8, and interchanging the signal point "000" and the signal point "011". By applying this mapping rule, even if the mapping of the D8PSK modulated signal (advance wave) is rotated, the mapping of the D8PSK modulated signal does not match the π/8-shift DQPSK modulated signal (delayed wave).

Figure 19:
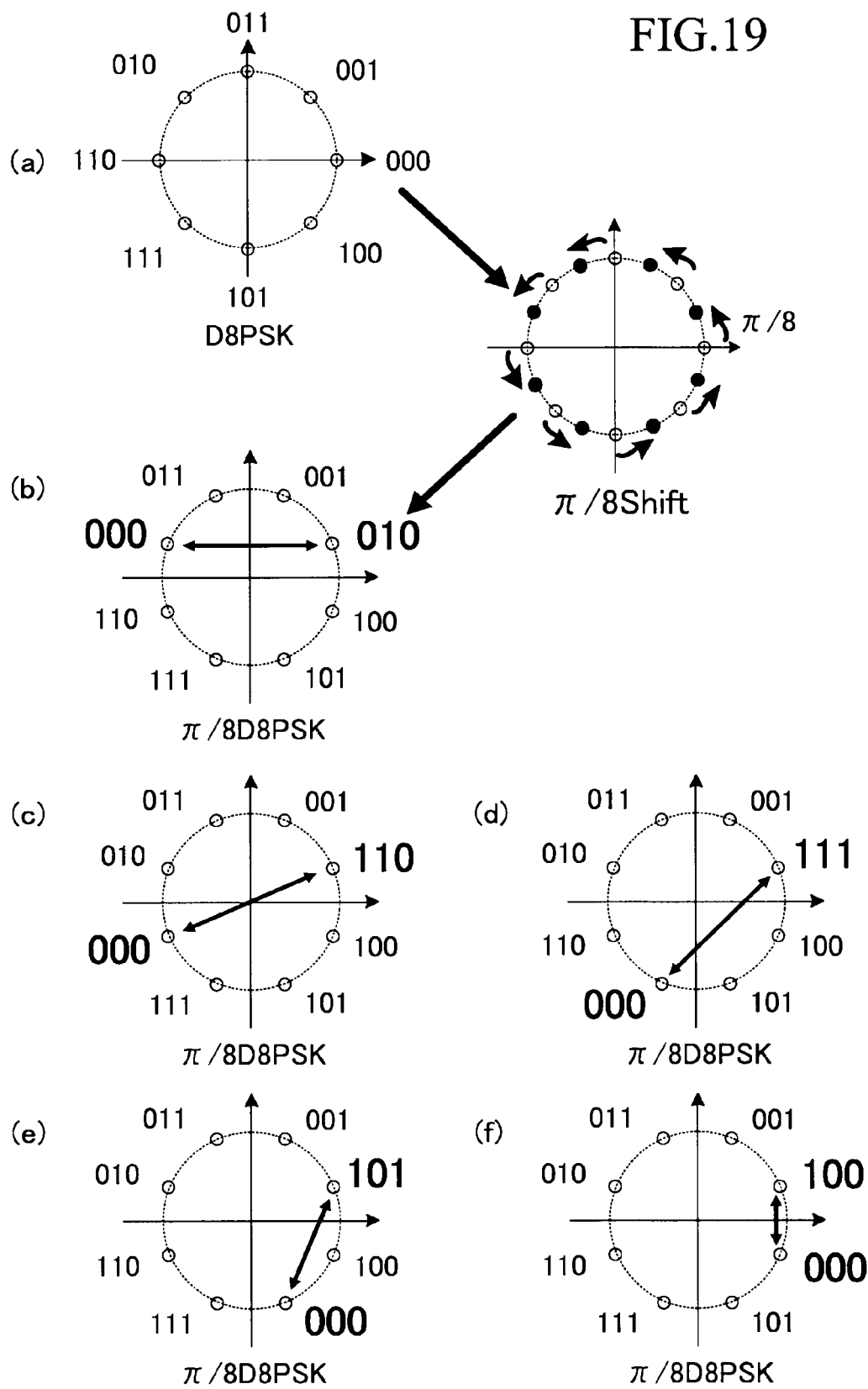
FIG. 19 is an explanatory drawing showing an example of mapping of π/8 D8PSK in an example of a mapping in which different mapping rules are applied to an advance wave and a delayed wave.

Furthermore, the following mapping rule can be applied to the π/8-shift DQPSK modulated signal which is the delayed wave. FIG. 19 is an explanatory drawing showing another example of the mapping in which different mapping rules are applied to the advance wave and the delayed wave. Because the explanatory drawing shown in FIG. 19 is similar to that shown in FIG. 17, the detailed explanation of FIG. 19 will be omitted hereafter. The delayed wave of FIGS. 19(b) to 19(f) on which the π/8-shift D8PSK modulation is performed follows a mapping rule of shifting each of the signal points of the D8PSK modulated advance wave by π/8, and interchanging a signal point (e.g. "000") and a signal point which is shifted by $(n/4) \times \pi$ (n is an integer ranging from 1 to 7) from a signal, e.g. "000" (e.g. "010" in FIG. 19(b)). By applying this mapping rule, even if the mapping of the D8PSK modulated signal (advance wave) is rotated, the mapping of the D8PSK modulated signal does not match the π/8-shift DQPSK modulated signal (delayed wave).

As previously explained, by applying either one of the mapping rules shown in FIGS. 17 to 19, even if the mapping of the D8PSK modulated signal (advance wave) is rotated, the mapping of the D8PSK modulated signal does not match the π/8-shift DQPSK modulated signal (delayed wave). More specifically, because the receive side can discriminate between the advance wave and the delayed wave even when a frequency deviation of 6.25% occurs in the D8PSK modulated signal which is the advance wave on the transmission line, there is provided an advantage of being able to avoid erroneous estimation of the modulation method and the frequency deviation, and being able to prevent a failure from occurring in the PSP demodulation process performed by the receive side. Furthermore, the frequency deviation permissible range can be enlarged by applying different mapping rules to the advance wave and the delayed wave because the mapping of the D8PSK modulated signal (advance wave) does not match the π/8-shift DQPSK modulated signal (delayed wave) even if the mapping of the D8PSK modulated signal is rotated. Furthermore, at the time of the 8PSK modulation, the amount of transmission information is twice as large as that at the time of a QPSK modulation if the same bandwidth is provided, and a larger amount of information can be transmitted. Furthermore, when the amount of transmission information is the same, the required bandwidth can be reduced to half the value at the time of a QPSK modulation, and effective use of frequencies can be made.

Embodiment 6

In above-mentioned Embodiment 5, to solve the problem that a D8PSK modulated signal which is an advance wave matches the mapping of a π/8-shift D8PSK modulated signal which is a delayed wave, and therefore a receive side cannot discriminate between the advance wave and the delayed wave and cannot estimate a frequency error and carry out a demodulation, a mapping rule of interchanging, for example, the signal point "000" and the signal point "001", among the eight signal points "000", "001", "011", "010", "110", "111", "101", and "100" on the complex plane of the π/8-shift D8PSK modulated signal which is the delayed wave, as shown in FIG. 17(b), is applied to the π/8-shift D8PSK modulated signal to change the arrangement of the information sequence, for example, to prevent the mapping of the D8PSK modulated signal (advance wave) from matching the π/8-shift D8PSK modulated signal (delayed wave). By using this structure, because the receive side can discriminate between the advance wave and the delayed wave even if a frequency deviation of 6.25% occurs in the D8PSK modulated signal which is the advance wave on the transmission line, there is provided an advantage of being able to avoid erroneous estimation of the modulation method and the frequency deviation, and being able to prevent a failure from occurring in the PSP demodulation process performed by the receive side.

However, there can be considered a case in which when only the shift D8PSK modulated signal which is the advanced wave, among the D8PSK modulated signal which is the advance wave and the π/8-shift D8PSK modulated signal which is the delayed waves, is blocked, only the delayed wave (π/8-shift D8PSK modulated signal) arrives at the receive side. At this time, when a symbol normalized frequency offset having a deviation of 6.25% occurs in the π/8-shift D8PSK modulated signal which is the delayed wave on the transmission line, there arises a problem that the D8PSK modulated signal which is the advance wave matches the mapping of the π/8-shift D8PSK modulated signal which is the delayed wave. Therefore, it is necessary to interchange signal points of the information sequence which is the advance wave to enable the receive side to discriminate between the advance wave and the delayed wave. To begin with, unless the mapping of the D8PSK modulated signal (advance wave) matches the mapping of the π/8-shift D8PSK modulated signal (delayed wave) even if they are rotated with respect to each other, the target whose arrangement of the information sequence must be changed is not necessarily the delayed wave.

Figure 20:
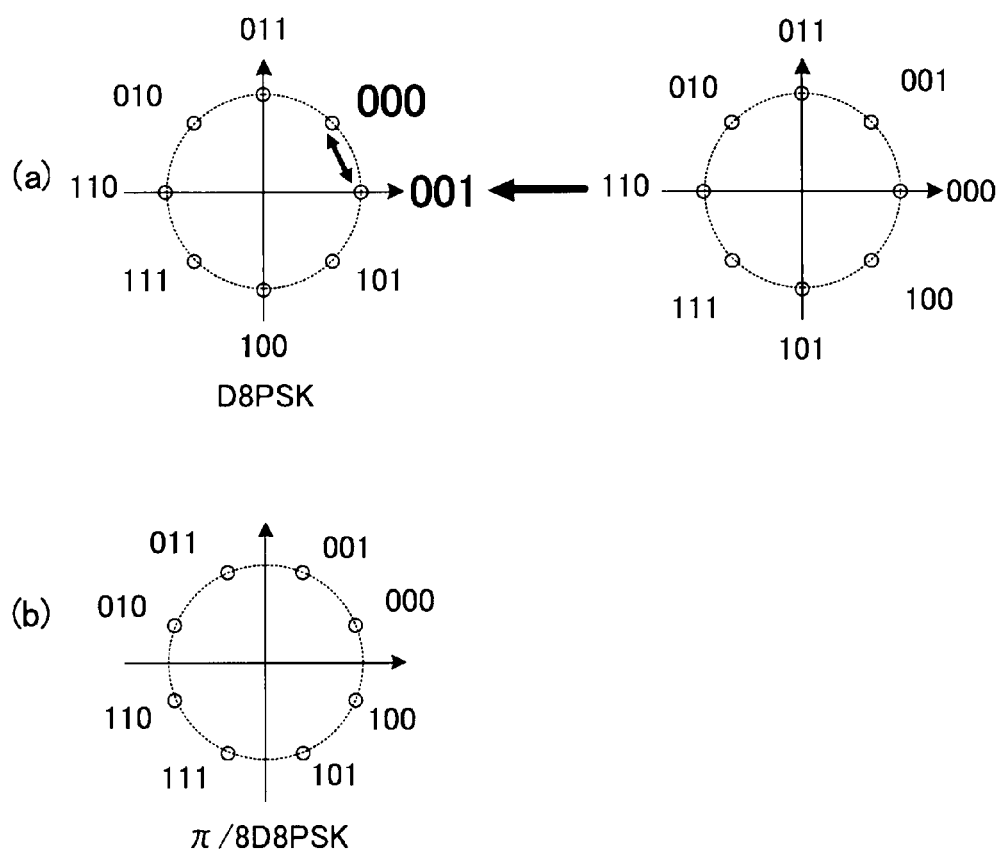
FIG. 20 is an explanatory drawing showing an example of a mapping in which different mapping rules are applied to an advance wave and a delayed wave.

Hereafter, an example of changing the arrangement of the information sequence of the advance wave in accordance with Embodiment 6 will be explained hereafter. FIG. 20 is an explanatory drawing showing an example of a mapping in which different mapping rules are applied to the advance wave and the delayed wave. The explanatory drawing shown in FIG. 20 is a signal space diagram in which signal points are plotted on a complex plane on which an in-phase signal is placed on a horizontal axis (a real number axis: an I-axis), and a 90 Kout of phase (quadrature-phase) signal is placed on a vertical axis (an imaginary number axis: a Q-axis). Eight points "000", "001", "011", "010", "110", "111", "101", and "100" which are plotted in the view show signal points (constellation points). These signal points are also called symbols, and two bits can be encoded for each symbol. FIG. 20(a) shows an example of a mapping of the advance wave on which the D8PSK modulation is performed, and FIG. 20(b) shows an example of a mapping of the delayed wave on which the π/8-shift D8PSK modulation is performed.

The advance wave of FIG. 20(a) on which the D8PSK modulation is performed follows a mapping rule of interchanging, for example, the signal point "000" and the signal point "001", among the signal points of the D8PSK modulated advance wave of FIG. 20(a). By applying this mapping rule of interchanging the signal points of the information sequence, even if the mapping of the D8PSK modulated signal (advance wave) and the mapping of the π/8-shift D8PSK modulated signal (delayed wave) are rotated, they do not match each other.

Figure 21:
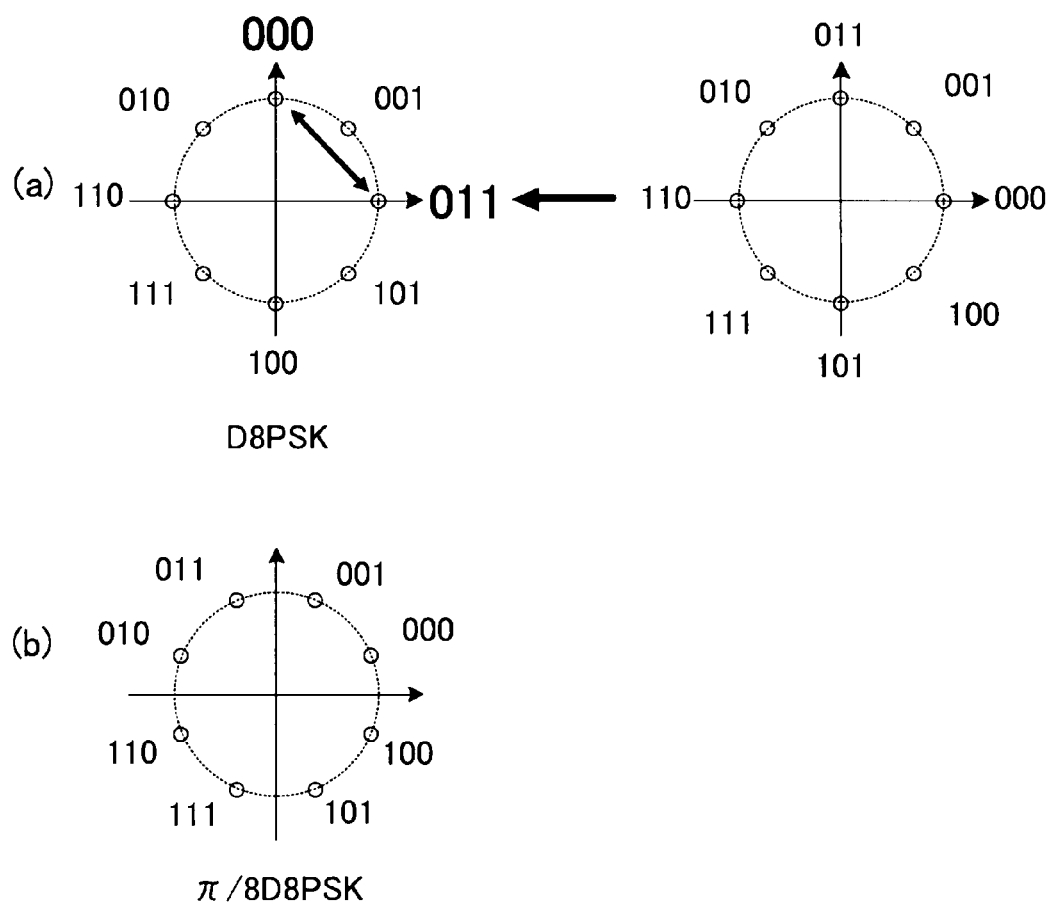
FIG. 21 is an explanatory drawing showing another example of the mapping in which different mapping rules are applied to the advance wave and the delayed wave.

Furthermore, the following mapping rule can be applied to the D8PSK modulated signal which is the advance wave. FIG. 21 is an explanatory drawing showing another example of a mapping in which different mapping rules are applied to the advance wave and the delayed wave. Because the explanatory drawing shown in FIG. 21 is similar to that shown in FIG. 20, the detailed explanation of FIG. 21 will be omitted hereafter. The advance wave of FIG. 21(a) on which the D8PSK modulation is performed follows a mapping rule of interchanging, for example, the signal point "000" and the signal point "011", among the signal points of the D8PSK modulated advance wave of FIG. 21(a). By applying this mapping rule, even if the mapping of the D8PSK modulated signal (advance wave) and the mapping of the π/8-shift D8PSK modulated signal (delayed wave) are rotated, they do not match each other.

Figure 22:
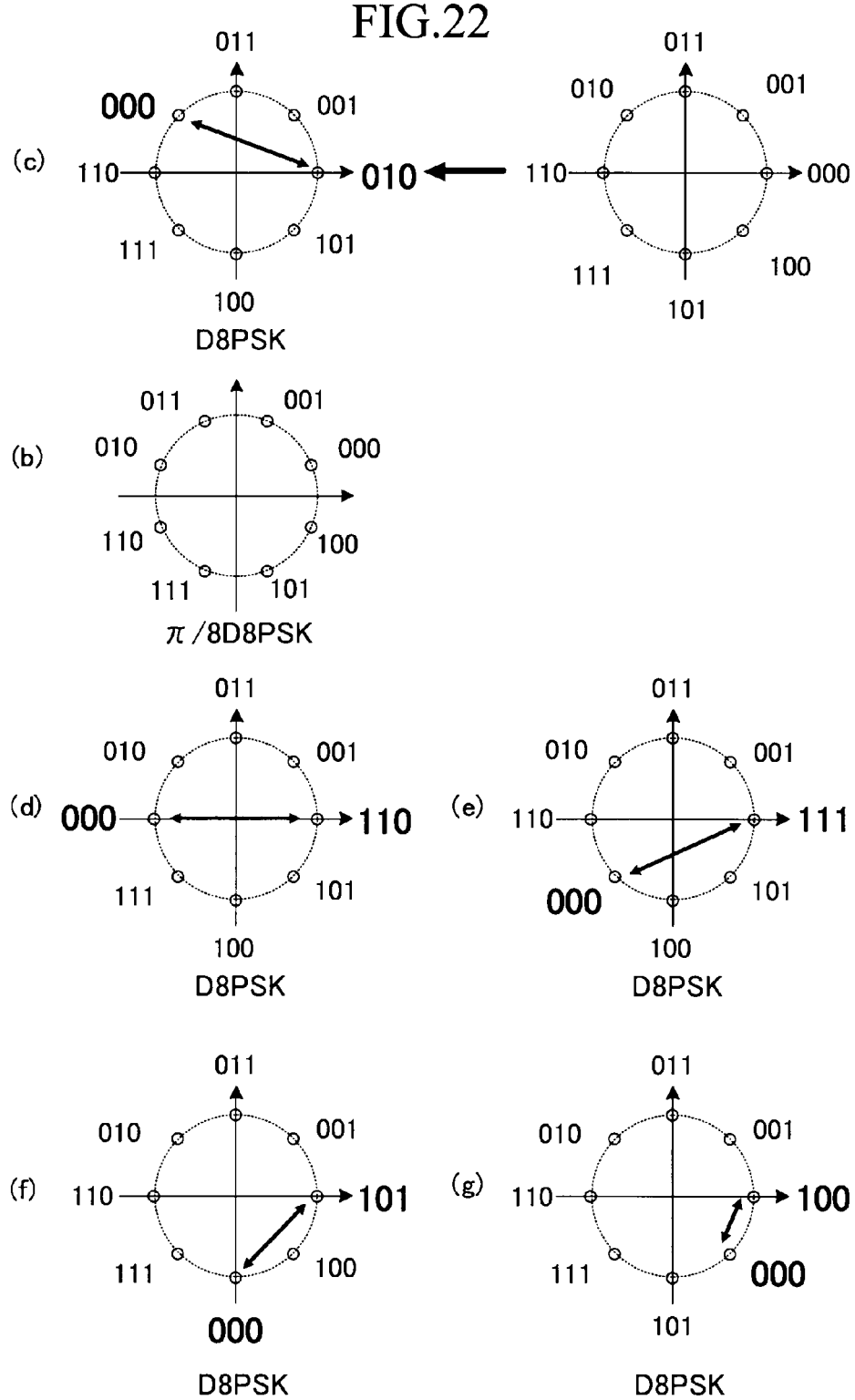
FIG. 22 is an explanatory drawing showing an example of mapping of D8PSK in an example of a mapping in which different mapping rules are applied to an advance wave and a delayed wave.

Furthermore, the following mapping rule can be applied to the D8PSK modulated signal which is the advance wave. FIG. 22 is an explanatory drawing showing another example of a mapping in which different mapping rules are applied to the advance wave and the delayed wave. Because the explanatory drawing shown in FIG. 22 is similar to that shown in FIG. 20, the detailed explanation of FIG. 22 will be omitted hereafter. The advance wave of FIGS. 22(c) to 22(g) on which the D8PSK modulation is performed follows a mapping rule of interchanging, for example, the signal point "000" and a signal point which is shifted by $(n/4) \times \pi$ (n is an integer ranging from 1 to 7) from a signal point, e.g. "000" (e.g. "010" in FIG. 22(c)). By applying this mapping rule, even if the mapping of the D8PSK modulated signal (advance wave) and the mapping of the π/8-shift D8PSK modulated signal (delayed wave) are rotated, they do not match each other.

As previously explained, by applying either one of the mapping rules shown in FIGS. 20 to 22, even if the mapping of the D8PSK modulated signal (advance wave) and the mapping of the π/8-shift D8PSK modulated signal (delayed wave) are rotated, they do not match each other. More specifically, because the receive side can discriminate between the advance wave and the delayed wave even when a frequency deviation of 6.25% occurs in the π/8-shift D8PSK modulated signal which is the delayed wave on the transmission line, there is provided an advantage of being able to avoid erroneous estimation of the modulation method and the frequency deviation, and being able to prevent a failure from occurring in the PSP demodulation process performed by the receive side. Furthermore, the frequency deviation permissible range can be enlarged by applying different mapping rules to the advance wave and the delayed wave because the mapping of the D8PSK modulated signal (advance wave) does not match the mapping of the π/8-shift D8PSK modulated signal (delayed wave).

INDUSTRIAL APPLICABILITY

As mentioned above, because the radio communication device in accordance with the present invention includes a transmitter which performs PADM transmission by applying a different mapping rule to each of an advance wave and a delayed wave, the radio communication device is suitable for carrying out communications using PADM transmission diversity.

The invention claimed is:

1. A radio communication device which has two antennas and uses PADM (Per transmit Antenna Differential Mapping) transmission diversity of performing a different differential phase shift modulation for each of the transmit antennas on signals created on a basis of an identical information sequence, and transmitting the signals, said radio communication device comprising:
an encoding unit for performing an encoding process on an inputted information sequence for each of the transmit antennas;
a delaying unit for delaying a transmission timing of a first one to be transmitted from one of the antennas, among information sequences which said encoding unit creates by encoding the inputted information sequence and which respectively correspond to the two antennas, with respect to a transmission timing of a second one of the information sequences to be transmitted from the other one of the antennas;
a modulating unit for performing a π/4-shift differential phase shift modulation process on said first information sequence, and for performing a differential phase shift modulation process on said second information sequence;
an information sequence arrangement changing unit for interchanging two of signal points in the first information sequence to change arrangement of said first information sequence the signal points in the first information sequence to be mapped onto a complex plane consisting of a real number axis and an imaginary number axis; and
a mapping unit for mapping each of said first and second information sequences onto an individual complex plane as signal points, said first information sequence having been processed by the information sequence arrangement changing unit.

2. The radio communication device according to claim 1, wherein said modulating unit performs a π/8-shift differential phase shift modulation process, instead of the π/4-shift differential phase shift modulation process, on said first information sequence.

3. The radio communication device according to claim 2, wherein said information sequence arrangement changing unit interchanges signal points of the second information sequence, instead of signal points of the first information sequence, to change arrangement of the information sequence.

4. The radio communication device according to claim 1, wherein said information sequence arrangement changing unit interchanges signal points of the second information sequence, instead of signal points of the first information sequence, to change arrangement of the information sequence.

5. A radio communication method executed by a radio communication device which has two antennas and uses PADM (Per transmit Antenna Differential Mapping) transmission diversity of performing a different differential phase shift modulation for each of the transmit antennas on signals created on a basis of an identical information sequence, and transmitting the signals, said radio communication method comprising:
an encoding step of performing an encoding process an inputted information sequence for each of the transmit antennas;
a delaying step of delaying a transmission timing of a first one to be transmitted from one of the antennas, among information sequences which are created in said encoding step of encoding the inputted information sequence and which respectively correspond to the two antennas, with respect to a transmission timing of a second one of the information sequences to be transmitted from the other one of the antennas;

a modulating step of performing a λ/4-shift differential phase shift modulation process on said first information sequence, and performing a differential phase shift modulation process on said second information sequence;

an information sequence arrangement changing step of interchanging two of signal points in the first information sequence to change arrangement of said first information sequence, the signal points in the first information sequence to be mapped onto a complex plane consisting of a real number axis and an imaginary number axis; and a mapping step of mapping each of said first and second information sequences onto an individual complex plane as signal points, said first information sequence having been processed by the information sequence arrangement changing step.

6. The radio communication method according to claim 5, wherein the modulating step is the one of performing a π/8-shift differential phase shift modulation process, instead of the π/4-shift differential phase shift modulation process, on said first information sequence.

7. The radio communication method according to claim 6, wherein said information sequence arrangement changing step is the one of interchanging signal points of the second information sequence, instead of signal points of the first information sequence, to change arrangement of the information sequence.

8. The radio communication method according to claim 5, wherein said information sequence arrangement changing step is the one of interchanging signal points of the second information sequence, instead of signal points of the first information sequence, to change arrangement of the information sequence.

9. A radio communication system, comprising:
a first transmitter; and
a second transmitter, wherein
the first and second transmitters implement PADM (Per transmit Antenna Differential Mapping) transmission diversity by performing different differential phase shift modulations on signals created on a basis of an identical information sequence to transmit the signals to a receive side,
said first transmitter includes a first encoding unit for performing an encoding process on an inputted information sequence for each of the transmit antennas, a first modulating unit for performing a differential phase shift modulation process on the information sequence encoded by said first encoding unit, and a first mapping unit for mapping the information sequence inputted to said first transmitter onto a complex plane which consists of a real number axis and an imaginary number axis as signal points, and
said second transmitter includes a second encoding unit for performing an encoding process on an information sequence which is a same as the information sequence inputted to said first transmitter, a delaying unit for delaying a transmission timing of said information sequence encoded by said second encoding unit with respect to a transmission timing of said first transmitter, a second modulating unit for performing a π/4-shift differential phase shift modulation process on the information sequence encoded by said second encoding unit, an information sequence arrangement changing unit for interchanging two of signal points in the information sequence to change arrangement of said information sequence, the signal points in the information sequence to be mapped onto a complex plane consisting of a real number axis and an imaginary number axis, and a second mapping unit for mapping the information sequence having been processed by the information sequence arrangement changing unit onto a complex plane as signal points.

10. The radio communication system according to claim 9, wherein said second modulating unit of said second transmitter performs a π/8-shift differential phase shift modulation process, instead of the π/4-shift differential phase shift modulation process, on the information sequence encoded by said second encoding unit.

11. The radio communication system according to claim 10, wherein
said information sequence arrangement changing unit is included in said first transmitter, instead of said second transmitter, and
said information sequence arrangement changing unit interchanges signal points of the information sequence encoded by the first encoding unit, instead of signal points of the first information sequence encoded by the second encoding unit, to change arrangement of the information sequence.

12. The radio communication system according to claim 9, wherein
said information sequence arrangement changing unit is included in said first transmitter, instead of said second transmitter, and
said information sequence arrangement changing unit interchanges signal points of the information sequence encoded by the first encoding unit, instead of signal points of the information sequence encoded by the second encoding unit, to change arrangement of the information sequence.

* * * * *